United States Patent
Okuda et al.

(10) Patent No.: US 10,723,903 B2
(45) Date of Patent: Jul. 28, 2020

(54) INK SET AND RECORDING METHOD

(71) Applicant: Seiko Epson Corporation, Tokyo (JP)

(72) Inventors: Ippei Okuda, Shiojiri (JP); Yoshiko Azami, Shiojiri (JP)

(73) Assignee: Seiko Epson Corporation (JP)

( * ) Notice: Subject to any disclaimer, the term of this patent is extended or adjusted under 35 U.S.C. 154(b) by 16 days.

(21) Appl. No.: 16/140,658

(22) Filed: Sep. 25, 2018

(65) Prior Publication Data

US 2019/0092958 A1  Mar. 28, 2019

(30) Foreign Application Priority Data

Sep. 27, 2017  (JP) ................. 2017-186732

(51) Int. Cl.
| | | |
|---|---|---|
| C09D 11/54 | (2014.01) |
| C09D 11/30 | (2014.01) |
| C09D 11/322 | (2014.01) |
| C09D 11/40 | (2014.01) |

(52) U.S. Cl.
CPC .............. *C09D 11/54* (2013.01); *C09D 11/30* (2013.01); *C09D 11/322* (2013.01); *C09D 11/40* (2013.01)

(58) Field of Classification Search
None
See application file for complete search history.

(56) References Cited

U.S. PATENT DOCUMENTS

| | | | | |
|---|---|---|---|---|
| 8,052,268 B2* | 11/2011 | Kabalnov | ............. | C09D 11/40 347/100 |
| 8,873,103 B2* | 10/2014 | Tsuchiya | .................. | B41J 2/21 347/100 |
| 2002/0038613 A1* | 4/2002 | Yatake | .................. | B41J 2/2056 106/31.6 |
| 2003/0071883 A1* | 4/2003 | Suzuki | .................. | C09D 11/40 347/100 |
| 2003/0109600 A1* | 6/2003 | Shirota | ................ | C09D 11/322 523/160 |
| 2004/0127601 A1* | 7/2004 | Sano | .................... | C09D 11/326 523/160 |
| 2005/0039632 A1* | 2/2005 | Yamamoto | ............. | C09D 11/40 106/31.27 |
| 2008/0231873 A1 | 9/2008 | Kabalnov et al. | | |

(Continued)

FOREIGN PATENT DOCUMENTS

| | | |
|---|---|---|
| JP | 2004-338259 A | 12/2004 |
| JP | 2005-246905 A | 9/2005 |

(Continued)

OTHER PUBLICATIONS

Extended European Search Report for Application No. EP 18 19 7098 dated Jan. 3, 2019 (5 pages).

*Primary Examiner* — Helene Klemanski
(74) *Attorney, Agent, or Firm* — Harness, Dickey & Pierce, P.L.C.

(57) ABSTRACT

There is provided an ink set used by being attached to a recording medium together with a reaction liquid which reacts with and aggregates components of an ink composition, the ink set including a first ink composition which includes a coloring material, a fixing resin, and a resin-dissolving solvent, and a second ink composition which includes a coloring material, a fixing resin, and a resin-dissolving solvent and which is the same color ink as the first ink composition.

18 Claims, 1 Drawing Sheet

(56) References Cited

U.S. PATENT DOCUMENTS

| | | |
|---|---|---|
| 2014/0255671 A1 | 9/2014 | Shiono |
| 2015/0054883 A1 | 2/2015 | Okuda et al. |
| 2015/0274998 A1 | 10/2015 | Kagata et al. |
| 2017/0037272 A1* | 2/2017 | Nakano .................. C09D 11/40 |
| 2019/0100672 A1* | 4/2019 | Mizutani .............. B41J 2/04563 |
| 2019/0284411 A1* | 9/2019 | Okuda ................. C09D 11/324 |
| 2019/0284425 A1* | 9/2019 | Okuda ................. B41M 7/0054 |

FOREIGN PATENT DOCUMENTS

| | | |
|---|---|---|
| JP | 2011-110755 A | 6/2011 |
| JP | 2013-129711 A | 7/2013 |

\* cited by examiner

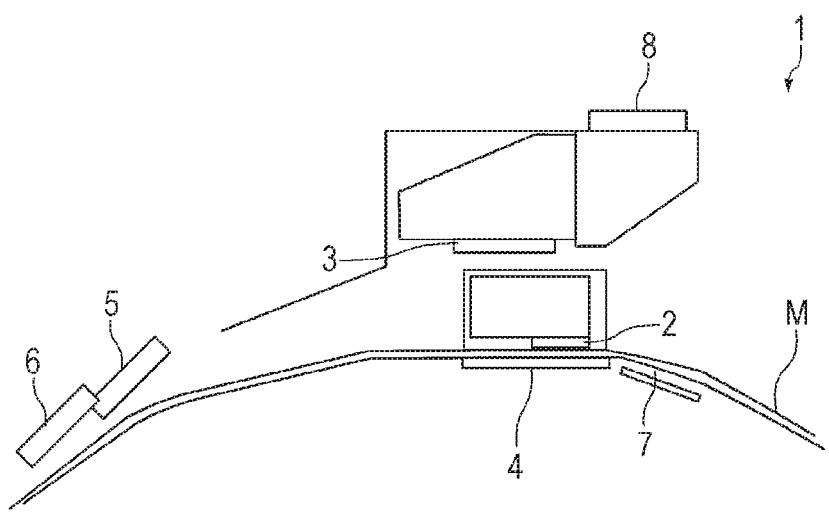

INK SET AND RECORDING METHOD

BACKGROUND

1. Technical Field

The present invention relates to an ink set and a recording method.

2. Related Art

An ink jet recording method for ejecting minute ink droplets from a nozzle of an ink jet head of an ink jet recording apparatus to record an image on a recording medium is known and the use thereof in the fields of sign printing and label printing is also being researched. In a case where an image is recorded on a recording medium with a low ink absorbing property (for example, art paper or coated paper) or a recording medium with an ink non-absorbing property (for example, a plastic film), the use of an aqueous ink jet ink composition (also referred to below as "an aqueous ink" or "an ink") as ink is being researched from the viewpoints of the global environment, safety for human bodies, and the like.

In recording using an aqueous ink jet ink composition, there is a technique with the object of obtaining a high-quality image having high gradation, in which color differences are suppressed and image quality graininess is reduced by using a combination of a dark ink and a light ink (both are also collectively referred to below as "light and dark inks") of the same color ink containing a component having reactivity such as a resin (for example, refer to JP-A-2004-338259).

However, in the case of using the light and dark ink, when a reaction liquid is used for the purpose of improving the image quality and obtaining ejection stability in the head, particularly in a low duty region using the light ink, the ink components may not be able to sufficiently react, it may be difficult to form quality images, and the abrasion resistance may decrease.

SUMMARY

An advantage of some aspects of the invention is to provide an ink set capable of satisfying both abrasion resistance and clogging reliability in a recording method using light and dark inks, and a recording method by solving at least a part of the problems described above and the like.

The invention can be realized in the following aspects or application examples.

Application Example 1

According to this application example, there is provided an ink set used by being attached to a recording medium together with a reaction liquid which reacts with and aggregates components of an ink composition, the ink set including a first ink composition which includes a coloring material, a fixing resin, and a resin-dissolving solvent, and a second ink composition which includes a coloring material, a fixing resin, and a resin-dissolving solvent and which is the same color ink as the first ink composition, in which a content of the coloring material in the second ink composition is smaller than a content of the coloring material in the first ink composition on a mass basis, a content of the fixing resin in the second ink composition is greater than a content of the fixing resin in the first ink composition on a mass basis, and a content of the resin-dissolving solvent in the second ink composition is greater than a content of the resin-dissolving solvent in the first ink composition on a mass basis.

According to the application example described above, a content of the fixing resin in the second ink composition in which the content of the coloring material is smaller than that in the first ink composition being greater than that in the first ink composition and a content of the resin-dissolving solvent which dissolves the resin on the recording medium also being greater than that in the first ink composition makes it possible to increase the abrasion resistance of the low duty region using the second ink composition. In addition, since using a reaction liquid makes it possible to form quality images without increasing the temperature during recording, it is possible to provide an ink set which is able to secure ejection stability in the head and to satisfy both abrasion resistance and clogging reliability in a recording method using light and dark inks.

Application Example 2

In the ink set according to the application example described above, the fixing resin included in the second ink composition may include a resin with an average particle diameter which changes so as to be increased by less than five times when a 0.3 M magnesium sulfate aqueous solution and a resin liquid in which 1% by mass of a resin is dispersed in water are stirred for one minute at a mass ratio of 1:1 in an environment of 25° C.

According to the application example described above, the fixing resin included in the second ink composition being a resin with low reactivity with an average particle diameter which changes so as to be increased by less than five times when a 0.3 M magnesium sulfate aqueous solution and a resin liquid in which 1% by mass of a resin is dispersed in water are stirred for one minute at a mass ratio of 1:1 in an environment of 25° C. makes smooth film formation possible when an image is formed by reaction with the reaction liquid, and further improves abrasion resistance. In addition, since the film is formed by covering the settled (reacted) coloring material with the fixing resin there is an advantage in terms of the abrasion resistance.

Application Example 3

In the ink set according to the application example described above, the content of the fixing resin in the second ink composition may be greater than the content of the fixing resin in the first ink composition by 0.5% by mass or more and 5% by mass or less.

According to the application example described above, the content of the fixing resin in the second ink composition being greater than the content of the fixing resin in the first ink composition by 0.5% by mass or more and 5% by mass or less further improves the abrasion resistance.

Application Example 4

In the ink set according to the application example described above, the content of the resin-dissolving solvent in the second ink composition may be greater than the content of the resin-dissolving solvent in the first ink composition by 0.5% by mass or more and 10% by mass or less.

According to the application example described above, the content of the resin-dissolving solvent in the second ink composition being greater than the content of the resin-dissolving solvent in the first ink composition by 0.5% by mass or more and 10% by mass or less further improves the abrasion resistance.

Application Example 5

In the ink set according to the application example described above, the content of the resin-dissolving solvent in the second ink composition may be 20% by mass or less.

According to the application example described above, the content of the resin-dissolving solvent in the second ink composition being 20% by mass or less further improves the clogging reliability.

Application Example 6

In the ink set according to the application example described above, the first ink composition and the second ink composition may each contain an alkylene polyol-based organic solvent having a standard boiling point over 280° C. with a content of less than 1% by mass.

According to the application example described above, the first ink composition and the second ink composition each containing an alkylene polyol-based organic solvent having a standard boiling point over 280° C. with a content of less than 1% by mass further improves the abrasion resistance.

Application Example 7

In the ink set according to the application example described above, the resin-dissolving solvent and the fixing resin included in the second ink composition may have a difference in SP value of 5 or less.

According to the application example described above, the resin-dissolving solvent and the fixing resin included in the second ink composition having a difference in SP value of 5 or less makes it possible to form a smoother film and further improves the abrasion resistance.

Application Example 8

According to this application example, there is provided a recording method using the ink set according to any one of Application Example 1 to Application Example 7 includes a attaching the reaction liquid to a recording medium, attaching the first ink composition to the recording medium, and attaching the second ink composition to the recording medium.

According to the application example described above, a content of the fixing resin in the second ink composition in which the content of the coloring material is smaller than that in the first ink composition being greater than that in the first ink composition and a content of the resin-dissolving solvent which dissolves the resin on the recording medium also being greater than that in the first ink composition makes it possible to increase the abrasion resistance of the low duty region using the second ink composition. In addition, since using a reaction liquid makes it possible to form images without increasing the temperature during recording, it is possible to provide a recording method which is able to secure ejection stability in the head and to satisfy both abrasion resistance and clogging reliability in a recording method using light and dark inks.

Application Example 9

In the recording method according to the application example described above, when attaching the first ink composition to the recording medium and attaching the second ink composition to the recording medium, a surface temperature of the recording medium may be 45° C. or lower, and in a secondary heating step of heating the recording medium after each step, the surface temperature of the recording medium may be 70° C. or higher.

According to the application example described above, a surface temperature of the recording medium being 45° C. or lower when attaching the first ink composition to the recording medium and attaching the second ink composition to the recording medium and the surface temperature of the recording medium being 70° C. or higher in a secondary heating step of heating the recording medium after each step further reduces nozzle clogging and makes it possible to satisfy both abrasion resistance and clogging reliability.

Application Example 10

In the recording method according to the application example described above, any one of a polyvalent metal salt, a cationic resin, and an organic acid may be included as an aggregating agent included in the reaction liquid.

According to the application example described above, any one of a polyvalent metal salt, a cationic resin, and an organic acid being included as an aggregating agent included in the reaction liquid further improves the abrasion resistance.

BRIEF DESCRIPTION OF THE DRAWING

The invention will be described with reference to the accompanying drawing, wherein like numbers reference like elements.

The FIGURE is a schematic cross-sectional view schematically showing an ink jet recording apparatus.

DESCRIPTION OF EXEMPLARY EMBODIMENTS

A description will be given below of preferable embodiments of the invention. The embodiments described below explain one example of the invention. In addition, the invention is not limited to the following embodiments, but also includes various modified examples implemented within a scope not changing the gist of the invention.

One embodiment of the ink set according to the present embodiment is an ink set used by being attached to a recording medium together with a reaction liquid which reacts with and aggregates components of an ink composition, the ink set including a first ink composition which includes a coloring material, a fixing resin, and a resin-dissolving solvent, and a second ink composition which includes a coloring material, a fixing resin, and a resin-dissolving solvent, which is the same color ink as the first ink composition, and in which a content of the coloring material is smaller than in the first ink composition, in which a content of the fixing resin in the second ink composition is greater than a content of the fixing resin in the first ink composition, and a content of the resin-dissolving solvent in the second ink composition is greater than a content of the resin-dissolving solvent in the first ink composition.

Another embodiment of the recording method according to the present embodiment is a recording method using the ink set according to the present embodiment and including attaching the reaction liquid to a recording medium, attaching the first ink composition to the recording medium, and attaching the second ink composition to the recording medium.

A description will be given below of examples of the ink set and the recording method according to the present embodiment in the order of a recording apparatus which performs the recording method, an ink composition (also referred to below as "ink"), a reaction liquid, a recording medium, and a recording method.

In the present specification, "Duty" is a value calculated by Formula (1).

$$\text{Duty (\%)} = \{\text{actual printed dot number}/(\text{vertical resolution} \times \text{horizontal resolution})\} \times 100 \quad (1)$$

(In the formula, "actual printed dot number" is the actual number of printed dots per unit of area, and "vertical resolution" and "horizontal resolution" are the resolution per unit of area respectively.)

1. EACH CONFIGURATION

1.1. Recording Apparatus

A description will be given of an example of a recording apparatus in which the recording method according to the present embodiment is carried out using an ink jet recording apparatus as an example. Examples of recording apparatuses able to be used for the recording method according to the present embodiment are not limited to ink jet recording apparatuses.

An example of an ink jet recording apparatus used in the present embodiment will be described with reference to the drawings. The FIGURE is a schematic cross-sectional view schematically showing an ink jet recording apparatus. As shown in the FIGURE, an ink jet recording apparatus 1 is provided with an ink jet head 2, an IR heater 3, a platen heater 4, a curing heater 5, a cooling fan 6, a preheater 7, and a ventilation fan 8. The ink jet recording apparatus 1 is provided with a control unit (not shown), and the entire operation of the ink jet recording apparatus 1 is controlled by the control unit.

The ink jet head 2 is a unit which ejects and attaches the ink composition and the reaction liquid to a recording medium M.

The ink jet head 2 is provided with a nozzle (not shown) for ejecting an ink composition and a reaction liquid. Examples of a method of ejecting ink from a nozzle include a method (electrostatic suction method) in which a strong electric field is applied between a nozzle and an accelerating electrode placed in front of the nozzle, droplet-shaped ink is continuously ejected from the nozzle, and ink droplets are ejected corresponding to a recording information signal while flying between deflection electrodes; a method in which pressure is applied to the ink by a small pump and the nozzle is mechanically vibrated by a crystal oscillator or the like to forcibly eject ink droplets; a method (piezo method) in which pressure is applied to ink by a piezoelectric element at the same time as a recording information signal and the ink droplets are ejected and recorded; a method (thermal jet method) in which ink is heated and foamed by a microelectrode according to a recording information signal and ink droplets are ejected and recorded, and the like.

As the ink jet head 2, it is possible to use any of a line type ink jet head and a serial type ink jet head.

Here, the ink jet recording apparatus provided with a serial type ink jet head performs recording by performing scanning (passes) for ejecting an ink composition a plurality of times while moving the ink jet head for recording relative to the recording medium. Specific examples of serial type ink jet heads include examples in which an ink jet head is mounted on a carriage which moves in the width direction of the recording medium (direction intersecting the transport direction of the recording medium), and the ink jet head moves in accordance with the movement of the carriage to eject droplets on the recording medium.

On the other hand, an ink jet recording apparatus provided with a line type ink jet head performs recording by performing scanning (a pass) for ejecting an ink composition once while moving the ink jet head for recording relative to the recording medium. Specific examples of the line type ink jet head include an example in which the ink jet head is formed to be wider than the width of the recording medium and the ink jet head ejects droplets on the recording medium without moving a recording head.

Here, in the present embodiment, an ink jet recording apparatus provided with a serial type ink jet head is used as the ink jet recording apparatus 1 and the ink jet head 2 which is used uses a piezo method as a method of ejecting ink from a nozzle.

The ink jet recording apparatus 1 is provided with the IR heater 3 and the platen heater 4 (primary heating or primary drying) for heating the recording medium M at the time of ejecting the ink composition from the ink jet head 2. In the present embodiment, in the ink composition attaching step described below, it is sufficient to use at least one of the IR heater 3 and the platen heater 4 when heating the recording medium M.

Using the IR heater 3 makes it possible to heat the recording medium M from the ink jet head 2 side. Due to this, although the ink jet head 2 is also easily heated at the same time, it is possible to raise the temperature without being influenced by the thickness of the recording medium M, in comparison with a case where the recording medium M is heated from the rear side, such as with the platen heater 4. In addition, when the platen heater 4 is used when heating the recording medium M, it is possible to heat the recording medium M from the side opposite to the ink jet head 2 side. Due to this, it is relatively difficult for the ink jet head 2 to be heated.

The upper limit of the surface temperature of the recording medium M according to the IR heater 3 and the platen heater 4 is preferably 45° C. or lower, more preferably 40° C. or lower, and even more preferably 35° C. or lower. In addition, the lower limit of the surface temperature of the recording medium M is preferably 25° C. or higher, more preferably 28° C. or higher, and even more preferably 30° C. or higher. Due to this, since radiation heat received from the IR heater 3 and the platen heater 4 is reduced or not received, it is possible to suppress drying and composition variations of the ink composition in the ink jet head 2 and ink and resin are suppressed from being deposited on the inner wall of the ink jet head 2. In addition, it is possible to fix the ink at an early stage and to improve image quality.

The curing heater 5 is for drying and solidifying the ink composition attached to the recording medium M (secondary heating or secondary drying). The curing heater 5 heating the recording medium M on which the image is recorded scatters and evaporates moisture or the like included in the ink composition more quickly to form the ink film using the resin of the fine resin particles included in the ink composition. In this manner, the ink film firmly fixes (attaches) to the recording medium M, the film forming property is excellent, and it is possible to obtain an excellent high-quality image in a short time. The upper limit of the surface temperature of the recording medium M according to the curing heater 5 is preferably 120° C. or lower, more preferably 100° C. or lower, and even more preferably 90° C. or lower. In addition, the lower limit of the surface temperature of the recording medium M is preferably 60° C. or higher, more preferably 70° C. or higher, and even more preferably 80° C. or higher. The temperature being within the above range makes it possible to obtain a high-quality image in a short time.

The ink jet recording apparatus 1 may have the cooling fan 6. After the ink composition recorded on the recording medium M is dried, the ink composition on the recording medium M is cooled by the cooling fan 6, such that it is possible to form an ink coating with good adhesion on the recording medium M.

In addition, the ink jet recording apparatus 1 may be provided with the preheater 7 which heats (preheats) the recording medium M in advance before the ink composition or the reaction liquid is attached to the recording medium M. Furthermore, the recording apparatus 1 may be provided with the ventilation fan 8 such that the ink composition or reaction liquid attached to the recording medium M is more efficiently dried.

1.2. Ink Compositions

Next, a description will be given of the ink compositions forming the ink set according to the present embodiment. Each of the first and second ink compositions forming the ink set according to the present embodiment includes a coloring material, a fixing resin, and a resin-dissolving solvent.

Here, in the present embodiment, the ink composition in which the content of the coloring material is greater on a mass basis is the first ink composition (dark ink), and the ink composition in which the content of the coloring material is smaller than that in the first ink composition on a mass basis is the second ink composition (light ink).

In addition, in the ink set according to the present embodiment, the first ink composition and the second ink composition are each inks of the same color type. "Same color type" means "having substantially the same hue angle" and means that the difference in the hue angle $\angle H$ of each recorded image recorded by the first and second ink compositions on a white recording medium is 30° or less. The hue angle $\angle H°$ is defined in the CIELAB color space and is determined using $\angle H° = \tan^{-1}(b^*/a^*) + 180$ (in a case where $a^* < 0$) or $\angle H° = \tan^{-1}(b^*/a^*) + 360$ (in a case where $a^* > 0$).

$a^*$ and $b^*$ represent perceptual chromaticity indices defined in the CIELAB color space. Examples of such combinations of dark ink and light ink of the same color type include a combination of a cyan ink and a light cyan ink (also referred to as a photo cyan ink), a combination of a magenta ink and a light magenta ink (also referred to as a photo magenta ink), a combination of a yellow ink and a light-yellow ink, and the like. In addition, it is possible to regard a dark ink and a light ink each including only the same coloring material as inks of the same color type.

In addition, in the ink compositions forming the ink set according to the present embodiment, the content of the fixing resin in the second ink composition is greater than the content of the fixing resin in the first ink composition on a mass basis, and the content of the resin-dissolving solvent in the second ink composition is greater than the content of the resin-dissolving solvent in the first ink composition on a mass basis.

A detailed description will be given below of components included in and able to be included in the ink composition forming the ink set according to the present embodiment.

Here, the ink composition forming the ink set according to the present embodiment is preferably an aqueous ink jet ink composition. Here, the "aqueous" ink-jet ink composition in the invention is a composition which has water as a main solvent and which does not have an organic solvent as a main solvent. The content of the organic solvent in the ink composition is preferably 30% by mass or less with respect to 100% by mass of the composition, more preferably 25% by mass or less, and particularly preferably 20% by mass or less. The content of water in the ink composition (100% by mass) is preferably 50% by mass or more, more preferably 60% by mass or more, and particularly preferably 70% by mass or more.

1.2.1. Coloring Material

In the present embodiment, the ink compositions include a coloring material. It is possible to use both a dye and a pigment as the coloring material, but a pigment is preferably used due to having a property of being resistant to discoloration due to light, gas, and the like. Images formed on a recording medium using pigments are not only excellent in image quality but also excellent in water resistance, gas resistance, light fastness, and the like and good in storability. These properties are remarkable particularly in a case of being formed on a recording medium with an ink non-absorbing property or low absorbing property. In the present embodiment, the first ink composition and the second ink composition may each include the same coloring material or may include different coloring materials.

The pigments usable in the present embodiment are not particularly limited, and examples thereof include inorganic pigments and organic pigments. As the inorganic pigment, in addition to titanium oxide and iron oxide, it is possible to use carbon black produced by a known method such as a contact method, a furnace method, or a thermal method. On the other hand, as the organic pigment, it is possible to use azo pigments (including azo lake, insoluble azo pigments, condensed azo pigments, chelate azo pigments, and the like), polycyclic pigments (for example, phthalocyanine pigments, perylene pigments, perinone pigments, anthraquinone pigments, quinophthalone pigments, and the like), nitro pigments, nitroso pigments, aniline black, and the like.

Among specific examples of pigments usable in the present embodiment, carbon black is an example of a black pigment, the carbon black is not particularly limited, and examples thereof include furnace black, lamp black, acetylene black, channel black, or the like (C. I. Pigment Black 7), and examples of commercial products include No. 2300, 900, MCF 88, No. 20B, No. 33, No. 40, No. 45, No. 52, MA 7, MA 8, MA 77, MA 100, No. 2200B, and the like (the above are trade names manufactured by Mitsubishi Chemical Corp.), Color black FW 1, FW 2, FW 2 V, FW 18, FW 200, S 150, S 160, S 170, Printex 35, U, V, 140 U, special black 6, 5, 4A, 4, 250, and the like (the above are trade names manufactured by Degussa), Conductex SC, Raven 1255, 5750, 5250, 5000, 3500, 1255, 700, and the like (the above are trade names manufactured by Columbia Carbon), and Regal 400R, 330R, 660R, Mogul L, Monarch 700, 800, 880, 900, 1000, 1100, 1300, 1400, Elftex 12, and the like (the above are trade names manufactured by Cabot Corp.).

The white pigment is not particularly limited, and examples thereof include white inorganic pigments of C. I. Pigment White 6, 18, 21, titanium oxide, zinc oxide, zinc sulfide, antimony oxide, magnesium oxide, and zirconium oxide. In addition to the white inorganic pigment, it is also possible to use white organic pigments such as white hollow resin particles and polymer particles.

The pigment used for the yellow ink is not particularly limited, and examples thereof include C. I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

The pigment used for the magenta ink is not particularly limited, and examples thereof include C. I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57: 1, 88, 112, 114, 122, 123, 144, 146, 149, 150, 166, 168, 170, 171, 175, 176, 177, 178, 179, 184, 185, 187, 202, 209, 219, 224, 245 or C. I. Pigment Violet 19, 23, 32, 33, 36, 38, 43, and 50.

The pigment used for the cyan ink is not particularly limited, and examples thereof include C. I. Pigment Blue 1, 2, 3, 15, 15: 1, 15: 2, 15: 3, 15: 34, 15: 4, 16, 18, 22, 25, 60, 65, 66; C. I. Vat Blue 4, and 60.

In addition, pigments used for color inks other than magenta, cyan, and yellow are not particularly limited, and examples thereof include C. I. Pigment Green 7, 10, C. I. Pigment Brown 3, 5, 25, 26, C. I. Pigment Orange 1, 2, 5, 7, 13, 14, 15, 16, 24, 34, 36, 38, 40, 43, and 63.

The content of the pigment included in the ink composition is preferably 0.1% by mass or more and 15% by mass or less with respect to the total mass (100% by mass) of the ink composition, more preferably 0.5% by mass or more and 10% by mass or less, and even more preferably 1.0% by mass or more and 7% by mass or less.

In order to apply the pigment described above to the ink composition, it is necessary to stably disperse and hold the pigment in water. Examples of the method include a method of dispersing with a dispersant resin such as a water-soluble resin and/or a water-dispersible resin (the pigment dispersed by this method is referred to below as a "resin-dispersed pigment"), a method of dispersing with a surfactant of a water-soluble surfactant and/or a water-dispersible surfactant (a pigment dispersed by this method is referred to below as a "surfactant-dispersed pigment"), a method in which a hydrophilic functional group is chemically and physically introduced to the surface of the pigment particle so as to be able to be dispersed and/or dissolved in water without a dispersant such as the resin or the surfactant (a pigment dispersed by this method is referred to below as a "surface-treated pigment"), and the like. In the present embodiment, it is possible to use any one of a resin-dispersed pigment, a surfactant-dispersed pigment, and a surface-treated pigment in the ink composition, and it is also possible to use a mixture of a plurality of kinds thereof as necessary.

Examples of the dispersant resin used in the resin-dispersed pigment include polyvinyl alcohols, polyvinyl pyrrolidones, polyacrylic acid, acrylic acid-acrylonitrile copolymers, vinyl acetate-acrylic acid ester copolymers, acrylic acid-acrylic acid ester copolymers, styrene-acrylic acid copolymers, styrene-methacrylic acid copolymers, styrene-methacrylic acid-acrylic acid ester copolymers, styrene-α-methylstyrene-acrylic acid copolymers, styrene-α-methylstyrene-acrylic acid-acrylic acid ester copolymers, styrene-maleic acid copolymers, styrene-maleic anhydride copolymers, vinyl naphthalene-acrylic acid copolymers, vinyl naphthalene-maleic acid copolymers, vinyl acetate-maleic acid ester copolymers, vinyl acetate-crotonic acid copolymers, vinyl acetate-acryl acid copolymers, and the like and salts thereof. Among these, in particular, a copolymer of a monomer having a hydrophobic functional group and a monomer having a hydrophilic functional group, and a polymer formed of a monomer having both a hydrophobic functional group and a hydrophilic functional group are preferable. As the form of the copolymer, it is possible to use any of form of a random copolymer, a block copolymer, an alternating copolymer, and a graft copolymer.

Examples of salts include salts of basic compounds such as ammonia, ethylamine, diethylamine, triethylamine, propylamine, isopropylamine, dipropylamine, butylamine, isobutylamine, diethanolamine, triethanolamine, tri-iso-propanolamine, aminomethylpropanol, and morpholine. The addition amount of these basic compounds is not particularly limited as long as the addition amount is the neutralization equivalent or more of the dispersant resin described above.

The molecular weight of the dispersant resin described above is preferably in the range of 1,000 to 100,000 as the mass average molecular weight, and more preferably in the range of 3,000 to 10,000. By the molecular weight being within the above range, a stable dispersion of the coloring material in water is obtained, and viscosity control and the like at the time of application to the ink composition are easy.

It is also possible to use commercial products as the dispersant resin described above. Specific examples thereof include Joncryl 67 (mass average molecular weight: 12,500, acid value: 213), Joncryl 678 (mass average molecular weight: 8,500, acid value: 215), Joncryl 586 (mass average molecular weight: 4,600, acid value: 108), Joncryl 611 (mass average molecular weight: 8,100, acid value: 53), Joncryl 680 (mass average molecular weight: 4,900, acid value: 215), Joncryl 682 (mass average molecular weight: 1,700, acid value: 238), Joncryl 683 (mass average molecular weight: 8,000, acid value: 160), Joncryl 690 (mass average molecular weight: 16,500, acid value: 240) (the above are trade names manufactured by BASF Japan Ltd.), and the like.

In addition, examples of the surfactant used for the surfactant-dispersed pigment include anionic surfactants such as alkane sulfonate, α-olefin sulfonate, alkylbenzene sulfonate, alkyl naphthalene sulfonate, acyl methyl taurate, dialkyl sulfosuccinate, alkylsulfuric acid ester salts, sulfated olefins, polyoxyethylene alkyl ether sulfuric acid ester salts, alkylphosphoric acid ester salts, polyoxyethylene alkyl ether phosphoric acid ester salts, and monoglyceride phosphoric acid ester salts, amphoteric surfactants such as alkylpyridinium salts, alkylamino acid salts, and alkyl dimethyl betaine, and nonionic surfactants such as polyoxyethylene alkyl ether, polyoxyethylene alkyl phenyl ether, polyoxyethylene alkyl ester, polyoxyethylene alkylamide, glycerine alkyl esters, and sorbitan alkyl esters.

The addition amount of the dispersant resin or the surfactant described above to the pigment is preferably 1 part by mass to 100 parts by mass with respect to 100 parts by mass of the pigment, and more preferably 5 parts by mass to 50 parts by mass. Within this range, it is possible to secure the dispersion stability of the pigment in water.

In addition, examples of surface-treated pigments include, as a hydrophilic functional group, —OM, —COOM, —CO—, —SO$_3$M, —SO$_2$NH$_3$, —RSO$_3$M, —PO$_3$HM, —PO$_3$M$_3$, —SO$_3$NHCOR, —NH$_3$, —NR$_3$ (here, M in the formula represents a hydrogen atom, an alkali metal, ammonium, or organic ammonium, and R indicates an alkyl group having 1 to 12 carbon atoms, a phenyl group which may have a substituent, or a naphthyl group which may have a substituent), and the like. These functional groups are physically and/or chemically introduced by grafting directly and/or via other groups on the pigment particle surface. Examples of polyvalent groups include an alkylene group having 1 to 12 carbon atoms, a phenylene group which may have a substituent, a naphthylene group which may have a substituent, and the like.

In addition, as the surface-treated pigment, a pigment is preferable which is surface treated such that —$SO_3M$ and/or —$RSO_3M$ (M is a counter ion and indicates a hydrogen ion, alkali metal ion, ammonium ion, or organic ammonium ion) is chemically bonded to the pigment particle surface using a treating agent including sulfur, that is, a pigment is preferable which does not have active protons, which has no reactivity with sulfonic acid, and which is dispersed in a solvent in which the pigment is insoluble or poorly soluble, and which is then subjected to a surface treatment such that —$SO_3M$ and/or —$RSO_3M$ is chemically bonded to the particle surface with amidosulfuric acid or a complex of sulfur trioxide and a tertiary amine such that the pigment is dispersible and/or dissolvable in water.

As a surface treatment unit for grafting the functional group or a salt thereof onto the surface of the pigment particle directly or via a polyvalent group, it is possible to apply various known surface treatment units. Examples of the unit include a unit for applying ozone or a sodium hypochlorite solution to commercially available oxidized carbon black and subjecting the carbon black to a further oxidization treatment to further hydrophilize the surface thereof (for example, JP-A-7-258578, JP-A-8-3498, JP-A-10-120958, JP-A-10-195331, and JP-A-10-237349), a unit for treating carbon black with 3-amino-N-alkyl substituted pyridium bromide (for example, JP-A-10-195360 and JP-A-10-330665), a unit for dispersing an organic pigment in a solvent in which the organic pigment is insoluble or poorly soluble, and introducing a sulfone group onto the surface of the pigment particle using a sulfonating agent (for example, JP-A-8-283596, JP-A-10-110110, and JP-A-10-110111), a unit for dispersing an organic pigment in a basic solvent which forms a complex with sulfur trioxide, treating the surface of an organic pigment by adding sulfur trioxide, and introducing a sulfone group or a sulfonamino group (for example, JP-A-10-110114), and the like; however, the unit for preparing the surface-treated pigment used in the invention is not limited to these units.

One or a plurality of functional groups may be grafted to one pigment particle. The kind and degree of the functional group to be grafted may be appropriately determined in consideration of the dispersion stability in the ink, the color density, the drying property on the front face of the ink jet head, and the like.

As methods of dispersing the resin-dispersed pigment, the surfactant-dispersed pigment, and the surface-treated pigment in water, a pigment, water, and a dispersant resin are added for the resin-dispersed pigment, a pigment, water, and a surfactant are added for the surfactant-dispersed pigment, a surface-treated pigment and water are added for the surface-treated pigment, and a water-soluble organic solvent/neutralizing agent and the like are added to each as necessary, and it is possible to carry out the method in a dispersing machine used in the related art such as a ball mill, a sand mill, an attritor, a roll mill, an agitator mill, a Henschel mixer, a colloid mill, an ultrasonic homogenizer, a jet mill, an Ang mill, or the like. In such a case, regarding the particle diameter of the pigment, the dispersion is performed with an average particle diameter in a range of 20 nm and 500 nm and more preferably in a range of 50 nm and 200 nm, which is preferable from the viewpoint of securing the dispersion stability of the pigment in water.

1.2.2. Fixing Resin

In the present embodiment, the ink composition contains a fixing resin, and the content of the fixing resin in the second ink composition is greater than the content of the fixing resin in the first ink composition. The fixing resin has an action of solidifying the ink composition and firmly fixing the solidified substance of the ink on the recording medium. In the present embodiment, it is possible to include the fixing resin by dispersing (that is, in an emulsion state or a suspension state) a resin which is poorly soluble or insoluble in the solvent of the ink composition used in the present embodiment in the form of fine particles, also referred to as a "binder solid" or a "resin emulsion".

The fixing resin used in the present embodiment is not particularly limited, but in addition to the resin used as the dispersant resin described above, examples thereof include homopolymers or copolymers of (meth)acrylic acid, (meth) acrylic acid ester, acrylonitrile, cyanoacrylate, acrylamide, olefin, styrene, vinyl acetate, vinyl chloride, vinyl alcohol, vinyl ether, vinylpyrrolidone, vinylpyridine, vinylcarbazole, vinylimidazole, and vinylidene chloride, fluororesins, and natural resins. Among these, acrylic resins which are homopolymers or copolymers of at least one of (meth) acrylic monomers such as (meth)acrylic acid, (meth)acrylic acid ester, acrylonitrile, and cyanoacrylate are preferable. Among acrylic resins, copolymers of (meth)acrylic monomers and vinyl monomers are preferable. The vinyl monomers are not limited and examples thereof include styrene and the like, and a styrene-acrylic copolymer-based resin which is a copolymer of a (meth)acrylic monomer and styrene is particularly preferable. The copolymer described above may be in any form of a random copolymer, a block copolymer, an alternating copolymer, or a graft copolymer. In addition, as the resin, in addition to the above, polyurethane resins, polyester resins, and polyether resins are preferably used.

In addition, the fixing resin may be a linear or branched polymer, a three-dimensionally cross-linked polymer, and a three-dimensionally cross-linked polymer is preferable.

In order to obtain the resin described above in a fine particle state, the methods shown below may be used, any of these methods may be used, and a plurality of methods may be combined as necessary. Examples of the method include a method in which a polymerization catalyst (polymerization initiator) and a dispersant are mixed and polymerized (that is, emulsion polymerization) in a monomer forming a desired resin; a method in which a resin having a hydrophilic moiety is dissolved in a water-soluble organic solvent and this solution is mixed in water and then the water-soluble organic solvent is removed by distillation or the like, a method in which a resin is dissolved in a water-insoluble organic solvent and this solution is mixed with a dispersant in an aqueous solution to obtain the resin described above, or the like. It is possible to appropriately select the method described above depending on the type and characteristics of the resin to be used. The dispersant which is able to be used when dispersing the resin is not particularly limited, and examples thereof include anionic surfactants (for example, sodium dodecylbenzenesulfonate, sodium lauryl phosphate, polyoxyethylene alkyl ether sulfate ammonium salt, and the like), nonionic surfactants (for example, polyoxyethylene alkyl ethers, polyoxyethylene alkyl esters, polyoxyethylene sorbitan fatty acid esters, polyoxyethylene alkyl phenyl ethers, and the like), and the above may be used alone or in a mixture of two or more.

In a case where the resin as described above is used in a fine particle state (emulsion state or suspension state), it is also possible to use resins obtained by known materials and methods. For example, those described in JP-B-62-1426, JP-A-3-56573, JP-A-3-79678, JP-A-3-160068, JP-A-4-18462, and the like may be used. In addition, it is also possible to use commercially available products, and examples thereof include Microgel E-1002, Microgel E-5002 (the above are trade names, manufactured by Nippon Paint Co., Ltd.), Boncoat 4001, Boncoat 5454 (the above are trade names, manufactured by DIC Corp.), SAE 1014 (trade name, manufactured by Zeon Corp.), Cybinol SK-200 (trade name, manufactured by Saiden Chemical Industry Co., Ltd.), Jurimer AT-613 (trade name, manufactured by Toagosei Co., Ltd.), Vinyblan 700 (trade name, manufactured by Nissin Chemical Industry Co., Ltd.), Joncryl 7100, Joncryl 390, Joncryl 711, Joncryl 511, Joncryl 7001, Joncryl 632, Joncryl 741, Joncryl 450, Joncryl 840, Joncryl 74J, Joncryl HRC-1645J, Joncryl 734, Joncryl 852, Joncryl 7600, Joncryl 775, Joncryl 537 J, Joncryl 1535, Joncryl PDX-7630A, Joncryl 352J, Joncryl 352D, Joncryl PDX-7145, Joncryl 538 J, Joncryl 7640, Joncryl 7641, Joncryl 631, Joncryl 790, Joncryl 780, Joncryl 7610 (the above are trade names, manufactured by BASF Japan Ltd.), and the like.

The fixing resin may include a composite resin. The composite resin is formed of two or more kinds of resins which are different from each other in the composition (at least one of the kind and content ratio) of the monomer components forming the resin as the resin performing the fixing, and it does not matter which part of the fixing resin is formed by the two or more kinds of resins. The two or more kinds of resins are not limited to kinds in which the resin compositions are able to be distinguished in a non-continuous manner at the boundary, and the composition of the monomer components may be different in a continuous manner.

In particular, a case of using a core-shell resin as the fixing resin, in which one of two or more kinds of resins is used as a core resin and the other as a shell resin, and the core resin is a resin which mainly forms the central section of the fine resin particles, and the shell resin is a resin which mainly forms the peripheral section of the fine resin particles, is preferable in terms of being able to change the characteristics of each of the resins in the peripheral section and the central section of the resins. In such a case, the shell resin may form at least a part of the peripheral section of the fixing resin. Here, the core-shell resin is described as an example of the composite resin, but the composite resin is not limited to a core-shell resin, and the same effects are able to be obtained as long as the resin is a composite resin. The core-shell resin is preferable in terms of being able to easily adjust the solubility of the resin since it is possible to independently control the degree of cross-linking and the glass transition temperature for the core and the shell.

In addition, even in a resin which is not a core-shell resin, it is possible to adjust the dissolution time depending on the glass transition temperature and the degree of cross-linking of the resin. Furthermore, without being limited to the glass transition temperature and the degree of cross-linking, it is also possible to carry out adjustment according to the composition, such as the kinds and amounts of monomers used for resin synthesis.

From the viewpoint of ensuring the storage stability and ejection reliability of the ink composition in a case of using the fixing resin in the state of fine particles, the average particle diameter thereof is preferably in a range of 5 nm or more and 400 nm or less, and more preferably in a range of 50 nm or more and 200 nm or more. The average particle diameter of the fine resin particles being in the above range makes the film forming property excellent and makes it hard to form large lumps even when aggregated, thus, it is possible to reduce nozzle clogging. The average particle diameter in this specification is on a volume basis unless otherwise specified. As a measuring method, for example, it is possible to carry out the measuring using a particle diameter distribution measuring apparatus using dynamic light scattering theory as a measurement principle. An example of such a particle diameter distribution measuring apparatus is "Microtrac UPA" manufactured by Nikkiso Co., Ltd.

The glass transition temperature (Tg) of the fixing resin is, for example, preferably −20° C. or higher and 100° C. or lower, more preferably −10° C. or higher and 80° C. or lower, and even more preferably 0° C. or higher and 76° C. or lower.

The lower limit of the total content of the fixing resin is preferably 0.1% by mass or more with respect to the total mass (100% by mass) of the ink composition in terms of solid content, more preferably 0.5% by mass or more, even more preferably 2% by mass or more, and particularly preferably 4% by mass or more. The upper limit of the total content of the resins is preferably 15% by mass or less with respect to the total mass (100% by mass) of the ink composition, more preferably 10% by mass or less, even more preferably 7% by mass or less, and particularly preferably 5% by mass or less. The content of the fixing resin being within the above range secures clogging reliability during recording and makes it possible to form an image excellent in abrasion resistance even on a recording medium with an ink non-absorbing property or low absorbing property.

In the present embodiment, the content of the fixing resin in the second ink composition in which the content of the coloring material is smaller than that in the first ink composition is greater than that in the first ink composition, specifically, the content of the fixing resin in the second ink composition is preferably greater by 0.5% by mass or more and 5% by mass or less than the content of the fixing resin in the first ink composition, more preferably greater by 1.0% by mass or more and 4% by mass or less, and even more preferably greater by 1.5% by mass or more and 3.5% by mass or less. By being within the above range, it is possible to increase the abrasion resistance of printed matter, particularly in a low duty region using the second ink composition. In addition, it is possible to secure clogging reliability during recording in the first ink composition in which the content of the coloring material is great.

In addition, in the second ink composition in which the content of the coloring material is smaller than that in the first ink composition, the fixing resin included in the second ink composition is preferably a resin with low reactivity with an average particle diameter which changes so as to be increased by less than five times when a 0.3 M magnesium sulfate aqueous solution and a resin liquid in which 1% by mass of a resin is dispersed in water are stirred for one minute at a mass ratio of 1:1 in an environment of 25° C. By using a resin having low reactivity in the second ink composition, when the ink component reacts with the reaction liquid to form an image, the film is formed by covering the settled (reacted) coloring material with the fixing resin, thus, smooth film formation is possible and the abrasion resistance is further improved. The average particle diameter in this specification is on a volume basis unless otherwise specified. As a measuring method, for example, it is possible to carry out the measuring using a particle diameter distribution measuring apparatus using dynamic light scattering theory as a measurement principle. An example of such a particle diameter distribution measuring apparatus is "Microtrac UPA" manufactured by Nikkiso Co., Ltd.

Furthermore, in the second ink composition, as the fixing resin, it is preferable to include a resin in which the difference in the SP value with a resin-dissolving solvent described below is less than 5, it is more preferable to include a resin in which the difference in the SP value is less than 4, it is even more preferable to include a resin in which the difference in the SP value is less than 3, and it is particularly preferable to include a resin in which the difference in the SP value is less than 2. The smaller the difference between the SP value of the fixing resin and the SP value of the resin-dissolving solvent, the easier the dissolution of the fixing resin in the resin-dissolving solvent and the more it is possible to secure the clogging reliability during recording. In addition, since the smooth film forming property on a recording medium is excellent, it is possible to form an image having excellent abrasion resistance.

If a fixing resin having a difference in SP value of less than 5 from the resin-dissolving solvent is included, it does not matter if resins having a difference in SP value of more than 5 from each other are included; however, in terms of securing clogging reliability during recording, the difference in SP value between all of the fixing resins and the resin-dissolving solvent is preferably less than 5.

Here, in this specification, the "SP value" refers to the compatibility parameter (solubility parameter) and may also be referred to as a solubility parameter. For the solvent, it is possible to calculate the SP value by calculation using the calculated Hildebrand SP value (δ) shown in formula I, while, for the resin, a resin is added to a solvent whose SP value is known such that the resin solid concentration in the liquid is 0.5% by mass, the dispersion stability of the resin is visually confirmed, and it is possible to take a low value of the dispersible SP value as the resin SP value.

$$\delta = \sqrt{(\Delta H - RT)/V} \qquad \text{Expression (I)}$$

1.2.3. Resin-Dissolving Solvent

In the present embodiment, the ink composition includes a resin-dissolving solvent, and the content of the resin-dissolving solvent in the second ink composition (light ink) is greater than the content of the resin-dissolving solvent in the first ink composition (dark ink) on a mass basis. In the present embodiment, the ink composition including the resin-dissolving solvent dissolves the resin of the recording medium on the recording medium to promote film formation and makes it possible to form an image excellent in abrasion resistance and image quality. In addition, it is possible to reduce clogging at the time of ejecting the ink composition.

In the present specification, the resin-dissolving solvent is a solvent having a property of dissolving the resin and, specifically, 1 g of the fixing resin contained in the ink composition of the present embodiment is added to 100 g of the solvent, the fixing resin dissolves when stirred at 80° C. for 1 hour, and clumps or particles of the fixing resin are not visible when visually observed.

The resin-dissolving solvent is preferably a solvent having compatibility even with water included in the ink. Specifically, solvents having a solubility of 0.5% by mass or more, which is parts by mass of the solvent to be dissolved with respect to 100 parts by mass of water at 25° C., are preferable.

More specific examples thereof include alcohols such as 2-methyl-1-butanol, 3-methyl-1-butanol, 1-hexanol, 2-methyl-1-pentanol, 4-methyl-2-pentanol, 2-(benzyloxy) ethanol, and the like.

Examples of the ethers include propylene oxide, furan, and the like.

Examples of ketones include 2-hexanone, 2-methyl-4-pentanone, mesityl oxide isophorone, and the like.

Examples of esters include n-propyl formate, n-butyl formate, isobutyl formate, n-propyl acetate, n-butyl acetate, isobutyl acetate, sec-butyl acetate, sec-hexyl acetate, ethyl propionate, butyl propionate, methyl butyrate, butyl butyrate, isobutyl isobutyrate, 2-butoxyethyl acetate, and the like.

Examples of nitrogen-containing compounds include 1-nitropropane, 2-nitropropane, and the like.

Examples of sulfur-containing compounds include dimethyl sulfide, diethyl sulfide, thiophene, and the like.

Examples of cyclic esters include compounds represented by Formula (1).

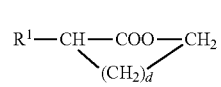

(In Formula (1), $R^1$ represents hydrogen or an alkyl group having 1 to 4 carbon atoms, and d represents an integer of 0 to 3. In addition, the alkyl group may be linear or branched.)

Examples of the compound represented by Formula (1) include cyclic esters (lactones) such as β-propiolactone, γ-butyrolactone, δ-valerolactone, ε-caprolactone, β-butyrolactone, γ-valerolactone, compounds in which hydrogen of a methylene group adjacent to a carbonyl group thereof is substituted with an alkyl group having 1 to 4 carbon atoms, and the like.

Examples of the alkoxyalkylamides include a compound represented by Formula (2).

$$R^2O\text{---}CH_2CH_2\text{---}CO\text{---}NR^3R^4 \qquad (2)$$

(In Formula (2), $R^2$ represents an alkyl group having 1 to 4 carbon atoms, and $R^3$ and $R^4$ each independently represents an alkyl group having 1 or 2 carbon atoms.)

The compound represented by Formula (2) is a β-alkoxypropionamide compound and examples thereof include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-propoxy-N,N-methylethylpropionamide, 3-iso-propoxy-N,N-dimethylpropionamide, 3-iso-propoxy-N,N-diethylpropionamide, 3-iso-propoxy-N,N-methylethylpropionamide, 3-tert-butoxy-N,N-dimethylpropionamide, 3-tert-butoxy-N,N-diethylpropionamide, 3-tert-butoxy-N,N-methylethylpropionamide, and the like.

Furthermore, heterocyclic compounds, cyclic amides, nitrogen-containing cyclic compounds and the like may be included.

Examples of the cyclic amides include a compound represented by Formula (3).

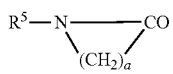

(In Formula (3), $R^5$ represents hydrogen or an alkyl group having 1 to 4 carbon atoms, and e represents an integer of 0 to 3. The alkyl group may be linear or branched.)

Examples of the compound represented by Formula (3) include 2-pyrrolidone, 1-methyl-2-pyrrolidone, 1-ethyl-2-pyrrolidone, and the like.

It is possible to use the above resin-dissolving solvents alone or in a mixture of two or more kinds. Among the resin-dissolving solvents described above, it is preferable to use any one kind or more selected from the group formed of cyclic amides, alkoxyamides, cyclic esters, and esters. In such a case, the abrasion resistance, sticking resistance, and image quality are further improved.

The upper limit of the content of the resin-dissolving solvent is preferably 25% by mass or less with respect to the total mass (100% by mass) of the ink composition, more preferably 20% by mass or less, even more preferably 15% by mass or less, and particularly preferably 10% by mass or less. In addition, the lower limit of the content of the resin-dissolving solvent is preferably 1% by mass or more with respect to the total mass (100% by mass) of the ink composition, more preferably 3% by mass or more, even more preferably 5% by mass or more, and particularly preferably 7% by mass or more. The content of the resin-dissolving solvent being within the above range further improves the abrasion resistance and the clogging reliability.

In addition, in the present embodiment, the content of the resin-dissolving solvent in the second ink composition is preferably greater by 0.5% by mass or more and 10% by mass or less than the content of the resin-dissolving solvent in the first ink composition, more preferably greater by 1.0% by mass or more and 8% by mass or less, and even more preferably greater by 3.0% by mass or more and 7.0% by mass or less. By being within the above range, it is possible to increase the abrasion resistance of printed matter, particularly in a low duty region using the second ink composition. In addition, it is possible to secure clogging reliability during recording in the first ink composition in which the content of the coloring material is great.

1.2.4. Water

In the present embodiment, the ink composition preferably contains water. Water is the main medium of the ink composition and is a component that evaporates and scatters when heated. The water is preferably pure water or ultrapure water obtained by removing ionic impurities as much as possible such as ion-exchanged water, ultra-filtered water, reverse osmosis water, or distilled water. In addition, when water sterilized by ultraviolet ray irradiation or addition of hydrogen peroxide or the like is used, it is possible to suppress the generation of fungi and bacteria in a case where pigment dispersion and the ink composition using the same are stored for a long time, which is preferable.

The content of water is preferably 50% by mass or more with respect to the total mass (100% by mass) of the ink composition, more preferably 60% by mass or more, and even more preferably 70% by mass or more.

1.2.5. Organic Solvent

The ink composition according to the present embodiment may contain an organic solvent other than the resin-dissolving solvent described above. The ink composition containing an organic solvent gives the ink composition ejected onto the recording medium a good drying property and makes it possible to obtain an image excellent in abrasion resistance.

The organic solvent used for the ink composition is preferably a water-soluble organic solvent. Using the water-soluble organic solvent further improves the drying property of the ink composition and makes it possible to obtain an image excellent in abrasion resistance.

Examples of organic solvents other than the resin-dissolving solvent are not particularly limited, and examples thereof include alcohols such as methanol, ethanol, and isopropyl alcohol; ketones or ketoalcohols such as acetone and diacetone alcohol; ethers such as tetrahydrofuran and dioxane; glycols such as hexanediol, ethylene glycol, diethylene glycol, triethylene glycol, polyethylene glycol, propylene glycol, dipropylene glycol, tripropylene glycol, polypropylene glycol, propanediol, butanediol, and pentanediol; lower alkyl ethers of glycols such as ethylene glycol monomethyl ether, diethylene glycol monomethyl ether, diethylene glycol monoethyl ether, and diethylene glycol monobutyl ether; amines having a hydroxyl group such as diethanolamine and triethanolamine; and glycerine. Among these, propylene glycol, 1,2-hexanediol, 1,3-butanediol, and the like are preferably used from the viewpoint of improving the drying property of the ink composition.

The content of the organic solvent other than the resin-dissolving solvent is preferably 0.5% by mass or more and 30% by mass or less with respect to the total mass (100% by mass) of the ink composition, more preferably 1.0% by mass or more and 25% by mass or less, and particularly preferably 2.0% by mass or more and 20% by mass or less. The standard boiling point of the organic solvent is preferably 180° C. or higher, more preferably 180° C. or higher and 300° C. or lower, even more preferably 200° C. or higher and 270° C. or lower, and particularly preferably 210° C. or higher and 250° C. or lower. In a case where the content of the organic solvent or the standard boiling point is in the above range, the ejection reliability and abrasion resistance of the ink composition are superior, which is preferable.

Here, an alkylene polyol-based organic solvent having a standard boiling point over 280° C. may absorb moisture of the ink to increase the viscosity of the ink near the ink jet head, which may lower the ejection stability of the ink jet head. In addition, the drying property is greatly reduced. For this reason, in the ink composition in the present embodiment, the content of the alkylene polyol-based organic solvent having a standard boiling point over 280° C. is preferably less than 3% by mass with respect to the total mass (100% by mass) of the ink composition, more preferably less than 2% by mass, even more preferably less than 1% by mass, yet more preferably less than 0.5% by mass, and still more preferably less than 0.1% by mass. In such a case, since the drying property of the ink composition on the recording medium becomes high, it is particularly suitable for recording on a recording medium with a low absorbing property or a non-absorbing recording medium, and it is possible to form an excellent image in which the generation of bleeding is suppressed. In addition, the stickiness of the obtained printed image is reduced, and water resistance and abrasion resistance are excellent.

Examples of an alkylene polyol-based organic solvent having a standard boiling point over 280° C. include glycerine. Glycerine has high hygroscopicity and a high boiling point, which may cause clogging and malfunctioning of the ink jet head. In addition, glycerine is poor in antiseptic properties and allows fungi and bacteria to easily propagate, thus, glycerine is preferably not contained in the ink composition.

1.2.6. Surfactant

In the present embodiment, the ink composition preferably contains a surfactant. The surfactant is not particularly limited, and examples thereof include an acetylene glycol-based surfactant, a fluorine-based surfactant, and a silicone-based surfactant, and at least one kind thereof is preferably contained.

The acetylene glycol-based surfactant is not particularly limited, but preferable examples thereof include one kind or more selected from 2,4,7,9-tetramethyl-5-decyne-4,7-diol and alkylene oxide adducts of 2,4,7,9-tetramethyl-5-decyne-4,7-diol, and 2,4-dimethyl-5-decyn-4-ol and alkylene oxide adducts of 2,4-dimethyl-5-decyn-4-ol. Commercial products of acetylene glycol-based surfactants are not particularly limited, and examples thereof include E series (trade names, manufactured by Air Products and Chemicals, Inc.) such as Olfine 104 series and Olfine E 1010, Surfynol 465, Surfynol 61, and Surfynol DF 110D (trade name, manufactured by Nissin Chemical Industry Co., Ltd.), and the like. The acetylene glycol-based surfactant may be used alone or in a combination of two or more kinds.

The fluorine-based surfactant is not particularly limited, and examples thereof include perfluoroalkyl sulfonate, perfluoroalkyl carboxylate, perfluoroalkyl phosphate ester, perfluoroalkyl ethylene oxide adduct, perfluoroalkyl betaine, and perfluoroalkyl amine oxide compounds. Commercial products of fluorine-based surfactants are not particularly limited and examples thereof include Surflon S144, S145 (the above are trade names, manufactured by AGC Seimi Chemical Co., Ltd.); FC-170C, FC-430, Fluorad-FC 4430 (the above are trade names, manufactured by Sumitomo 3M Ltd.); FSO, FSO-100, FSN, FSN-100, FS-300 (the above are trade names, manufactured by Dupont); FT-250, 251 (the above are trade names, manufactured by Neos Co., Ltd.). The fluorine-based surfactant may be used alone or in a combination of two or more kinds.

The silicone-based surfactant is not particularly limited, and examples thereof include a polysiloxane-based compound, a polyether-modified organosiloxane, and the like. Commercial products of silicone-based surfactants are not particularly limited, and specific examples thereof include BYK-306, BYK-307, BYK-333, BYK-341, BYK-345, BYK-346, BYK-347, BYK-348, and BYK-349 (the above are trade names, manufactured by BYK Additives & Instruments), KF-351 A, KF-352 A, KF-353, KF-354 L, KF-355 A, KF-615 A, KF-945, KF-640, KF-642, KF-643, KF-6020, X-22-4515, KF-6011, KF-6012, KF-6015, and KF-6017 (the above are trade names, manufactured by Shin-Etsu Chemical Co., Ltd.).

Among these, it is possible for the acetylene glycol-based surfactant to further improve nozzle clogging recoverability. On the other hand, the fluorine-based surfactant and the silicone-based surfactant are preferable in the point of having an action of spreading uniformly so as to not cause density unevenness or bleeding of the ink on the recording medium. Accordingly, in the present embodiment, the ink composition more preferably contains at least one of a silicone-based surfactant and a fluorine-based surfactant, and an acetylene glycol-based surfactant.

The lower limit of the content of the acetylene glycol-based surfactant is preferably 0.1% by mass or more with respect to the total mass (100% by mass) of the ink composition, more preferably 0.3% by mass or more, and particularly preferably 0.5% by mass or more. On the other hand, the upper limit of the content is preferably 5% by mass or less, more preferably 3% by mass or less, and particularly preferably 2% by mass or less. When the content of the acetylene glycol-based surfactant is within the above range, it is easy to obtain an effect of improving the nozzle clogging recoverability.

The lower limit of the content of the fluorine-based surfactant and the silicone-based surfactant is preferably 0.5% by mass or more, and more preferably 0.8% by mass or more. On the other hand, the upper limit of the content is preferably 5% by mass or less, and more preferably 3% by mass or less. When the contents of the fluorine-based surfactant and the silicone-based surfactant are in the ranges described above, it is preferable in the point of having an action of spreading uniformly so as to not cause density unevenness or bleeding of the ink on the recording medium.

1.2.7. Other Components

In the present embodiment, in order to satisfactorily maintain the storage stability of the ink composition and the ejection stability from the ink jet head, in order to improve clogging, or in order to prevent deterioration of the ink, it is also possible to appropriately add various additives such as an antifoaming agent, a dissolution agent, a viscosity adjusting agent, a pH adjusting agent, an antioxidant, a preservative, a fungicide, a corrosion inhibitor, a moisturizing agent which is not an organic solvent, a chelating agent for capturing metal ions which affect dispersion.

Examples of pH adjusting agents include potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, sodium bicarbonate, and the like.

Examples of preservatives/fungicides include sodium benzoate, sodium pentachlorophenol, sodium 2-pyridinethiol-1-oxide, sodium sorbate, sodium dehydroacetate, 1,2-dibenzisothiazolin-3-one, and the like. Examples of commercial products include Proxel XL 2, Proxel GXL (the above are trade names, manufactured by Avecia Ltd.), Denicide CSA, NS-500 W (the above are trade names, manufactured by Nagase ChemteX Corp.), and the like.

Examples of corrosion inhibitors include benzotriazole and the like.

Examples of chelating agents include ethylenediaminetetraacetic acid and salts thereof (disodium ethylenediaminetetraacetate disodium salt, and the like) and the like.

Examples of the moisturizing agent which is not an organic solvent include moisturizing agents which are solid at normal temperature, such as trimethylolpropane and sugar.

1.2.8. Method for Preparing Aqueous Ink Composition

The ink composition in the present embodiment is obtained by mixing the components described above in a freely chosen order and, as necessary, removing impurities by filtration or the like. As a method of mixing the respective components, a method is suitably used in which materials are sequentially added to a container provided with a stirrer such as a mechanical stirrer or a magnetic stirrer and stirred and mixed. As a filtration method, it is possible to carry out centrifugal filtration, filter filtration, and the like as necessary.

1.2.9. Physical Properties of Ink Composition

In the ink composition in the present embodiment, from the viewpoint of balance between image quality and reliability as ink for ink jet recording, the surface tension at 20° C. is preferably 18 mN/m or more and 40 mN/m or less, more preferably 20 mN/m or more and 35 mN/m or less, and even more preferably 22 mN/m or more and 33 mN/m or less. For the measurement of the surface tension, for example, it is possible to carry out measurement by confirming the surface tension when a platinum plate is wetted with ink in an environment of 20° C. using an automatic surface tensiometer CBVP-Z (trade name, manufactured by Kyowa Interface Science Co., Ltd.).

In addition, from the same viewpoint, the viscosity of the ink composition according to the present embodiment at 20° C. is preferably 3 mPa·s or more and 10 mPa·s or less, and more preferably 3 mPa·s or more and 8 mPa·s or less. Here, it is possible to measure the viscosity, for example, using a viscoelasticity tester MCR-300 (trade name, manufactured by Pysica) in an environment of 20° C.

1.3. Reaction Liquid

Next, a description will be given of the reaction liquid used in the recording method.

In the present embodiment, the reaction liquid contains a coloring material in an amount of 0.2% by mass or less and is not the aqueous ink-jet ink composition described above used for coloring a recording medium, but is an auxiliary liquid used by being attached to the recording medium before or after attaching the aqueous ink-jet ink composition.

1.3.1. Aggregating Agent

The reaction liquid used in the present embodiment preferably contains an aggregating agent for aggregating components of the ink composition. Due to the reaction liquid including an aggregating agent, in the ink composition attaching step described below, the aggregating agent and the resin included in the ink composition react quickly. By doing so, the dispersed state of the pigment or resin in the ink composition is destroyed, the pigment and the resin are aggregated, and this aggregate inhibits permeation of the pigment into the recording medium, thus, it is considered excellent in terms of improving the image quality of the recorded image.

Examples of aggregating agents include a polyvalent metal salt, a cationic compound (cationic resin, cationic surfactant, or the like), and an organic acid. These aggregating agents may be used alone or in a combination of two or more kinds. Among these aggregating agents, it is preferable to use at least one kind of aggregating agent selected from the group consisting of a polyvalent metal salt and a cationic resin from the viewpoint of excellent reactivity with the resin included in the ink composition.

The polyvalent metal salt is formed of divalent or higher polyvalent metal ions and anions bonded to these polyvalent metal ions and is a compound soluble in water. Specific examples of polyvalent metal ions include divalent metal ions such as $Ca^{2+}$, $Cu^{2+}$, $Ni^{2+}$, $Mg^{2+}$, $Zn^{2+}$, $Ba^{2+}$, and the like; and trivalent metal ions such as $Al^{3+}$, $Fe^{3+}$, and $Cr^{3+}$. Examples of anions include $Cl^-$, $I^-$, $Br^-$, $SO_4^{2-}$, $ClO_3^-$, $NO^{3-}$, and $HCOO^-$, $CH_3COO^-$, and the like. Among these polyvalent metal salts, calcium salts and magnesium salts are preferable from the viewpoints of stability of the reaction liquid and reactivity as an aggregating agent.

Preferable examples of organic acids include phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyrone carboxylic acid, pyrrole carboxylic acid, furancarboxylic acid, pyridine carboxylic acid, coumaric acid, thiophene carboxylic acid, nicotinic acid, a derivative of these compounds, or a salt thereof, and the like. One kind of organic acid may be used alone, or two or more kinds may be used in a combination.

Examples of cationic resins include a cationic urethane resin, a cationic olefin resin, a cationic allylamine resin, a polyamine resin, a quaternary ammonium salt polymer, and the like.

As the cationic urethane resin, it is possible to appropriately select and use known resins. It is possible to use commercial products as the cationic urethane resins and, for example, it is possible to use Hydran CP-7010, CP-7020, CP-7030, CP-7040, CP-7050, CP-7060, and CP-7610 (the above are trade names, manufactured by Dainippon Ink & Chemicals, Inc.), Superflex 600, 610, 620, 630, 640, and 650 (the above are trade names, manufactured by DKS Co., Ltd), urethane emulsion WBR-2120C and WBR-2122C (the above are trade names, manufactured by Taisei Fine Chemical Co., Ltd.), and the like.

The cationic olefin resin has an olefin such as ethylene or propylene in the structural skeleton thereof, and it is possible to appropriately select and use known resins. In addition, the cationic olefin resin may be in an emulsion state of being dispersed in a solvent including water, an organic solvent, or the like. As the cationic olefin resin, it is possible to use commercial products and examples thereof include Arrowbase CB-1200, CD-1200 (the above are trade names, manufactured by Unitika Ltd.), and the like.

It is possible to appropriately select and use known resins as the cationic allylamine resins, and examples thereof include polyallylamine hydrochloride, polyallylamine amide sulfate, allylamine hydrochloride-diallylamine hydrochloride copolymer, allylamine acetate-diallylamine acetate copolymer, allylamine hydrochloride-dimethylallylamine hydrochloride copolymer, allylamine-dimethylallylamine copolymer, polydiallylamine hydrochloride, polymethyldiallylamine hydrochloride, polymethyldiallylamine amide sulfate, polymethyldiallylamine acetate, polydiallyldimethylammonium chloride, diallylamine acetate-sulfur dioxide copolymer, diallylmethylethylammoniumethylsulfate-sulfur dioxide copolymers, methyl diallyl amine hydrochloride-sulfur dioxide copolymers, diallyldimethylammonium chloride-sulfur dioxide copolymers, diallyldimethylammonium chloride-acrylamide copolymer, and the like. It is possible to use commercial products such as cationic allylamine resins and, for example, it is possible to use PAA-HCL-01, PAA-HCL-03, PAA-HCL-05, PAA-HCL-3L, PAA-HCL-10L, PAA-H-HCL, PAA-SA, PAA-01, PAA-03, PAA-05, PAA-08, PAA-15, PAA-15 C, PAA-25, PAA-H-10C, PAA-D11-HCL, PAA-D41-HCL, PAA-D19-HCL, PAS-21CL, PAS-M-1L, PAS-M-1, PAS-22 SA, PAS-M-1A, PAS-H-1L, PAS-H-5L, PAS-H-10L, PAS-92, PAS-92A, PAS-J-81L, and PAS-J-81 (the above are trade names, manufactured by Nittobo Medical Co., Ltd.), Hymo Neo-600, Hymolock Q-101, Q-311, Q-501, and Himax SC-505 and SC-505 (the above are trade names, manufactured by Hymo Co., Ltd.), or the like.

Examples of cationic surfactants include primary, secondary, and tertiary amine salt type compounds, alkylamine salts, dialkylamine salts, aliphatic amine salts, benzalkonium salts, quaternary ammonium salts, quaternary alkyl ammonium salts, alkyl pyridinium salts, sulfonium salts, phosphonium salts, onium salts, imidazolinium salts, and the like. Specific examples of cationic surfactants include hydrochlorides such as laurylamine, Coco amine, and rosinamine, acetates, and the like, lauryltrimethylammonium chloride, cetyltrimethylammonium chloride, benzyltributylammonium chloride, benzalkonium chloride, dimethylethyl lauryl ammonium chloride ethyl sulfate, dimethyl ethyl octyl ammonium ethyl sulfate, trimethyl lauryl ammonium hydrochloride, cetyl pyridinium chloride, cetyl pyridinium bromide, dihydroxyethyl lauryl amine, decyl dimethyl benzyl ammonium chloride, dodecyl dimethyl benzyl ammonium chloride, tetradecyl dimethyl ammonium chloride, hexadecyl dimethyl ammonium chloride, octadecyl dimethyl ammonium chloride, and the like.

The concentration of the aggregating agent in the reaction liquid may be 0.03 mol/kg or more in 1 kg of the reaction liquid. In addition, in 1 kg of the reaction liquid, the concentration may be 0.1 mol/kg or more and 1.5 mol/kg or less and may be 0.2 mol/kg or more and 0.9 mol/kg or less. In addition, the content of the aggregating agent may be, for example, 0.1% by mass or more and 25% by mass or less with respect to the total mass (100% by mass) of the reaction liquid, may be 1% by mass or more and 20% by mass or less, and may be 3% by mass or more and 10% by mass or less.

1.3.2. Water

The reaction liquid used in the present embodiment is preferably an aqueous reaction liquid with water as the main solvent. This water is a component which is evaporated and scattered by drying after attaching the reaction liquid to the recording medium. As the water, pure water or ultrapure water obtained by removing ionic impurities as much as possible such as ion-exchanged water, ultra-filtered water, reverse osmosis water, and distilled water is preferable. In addition, the use of water sterilized by ultraviolet ray irradiation or the addition of hydrogen peroxide or the like is suitable since it is possible to prevent the propagation of fungi and bacteria in a case where the reaction liquid is stored for a long time. It is possible to set the content of water included in the reaction liquid to, for example, 40% by mass or more with respect to the total mass (100% by mass) of the reaction liquid, preferably 50% by mass or more, more preferably 60% by mass or more, and even more preferably 70% by mass or more.

1.3.3. Organic Solvent

The reaction liquid used in the present embodiment may contain an organic solvent. Containing an organic solvent makes it possible to improve the wettability of the reaction liquid on the recording medium. As the organic solvent, it is possible to use the same organic solvents as those exemplified for the aqueous ink jet ink composition described above. The content of the organic solvent is not particularly limited, but it is possible to set the content to, for example, 10% by mass or more and 80% by mass or less with respect to the total mass (100% by mass) of the reaction liquid, and preferably 15% by mass or more and 70% by mass or less.

For the standard boiling point of the organic solvent, it is possible for the standard boiling point of the organic solvent which may be contained in the ink composition to be set independently of the preferable temperature range of the standard boiling point of the organic solvent which may be contained in the ink composition. Alternatively, the standard boiling point of the organic solvent is preferably 180° C. or higher, more preferably 180° C. to 300° C., even more preferably 190° C. to 270° C., and particularly preferably 200° C. to 250° C.

Here, as the organic solvent in the reaction liquid, in the same manner as the ink composition described above, the content of a water-soluble organic solvent having a standard boiling point over 280° C. is preferably 5% by mass or less, more preferably 3% by mass or less, even more preferably 2% by mass or less, yet more preferably 1% by mass or less, and still more preferably 0.5% by mass or less. In this case, since the drying property of the reaction liquid is good, drying of the reaction liquid is quickly carried out, and the obtained recorded matter is excellent in stickiness reduction and abrasion resistance.

1.3.4. Surfactant

A surfactant may be added to the reaction liquid used in the present embodiment. Adding the surfactant makes it possible to lower the surface tension of the reaction liquid and to improve the wettability with the recording medium. Among the surfactants, for example, it is possible to preferably use an acetylene glycol-based surfactant, a silicone-based surfactant, or a fluorine-based surfactant. As specific examples of these surfactants, it is possible to use the same surfactants as exemplified for the aqueous ink jet ink composition described below. The content of the surfactant is not particularly limited, but it is possible to set the content to be 0.1% by mass or more and 5% by mass or less with respect to the total mass (100% by mass) of the reaction liquid.

1.3.5. Other Components

The pH adjusting agent, antiseptic/fungicide, corrosion inhibitor, chelating agent, and the like described above may be added to the reaction liquid used in the present embodiment, as necessary.

1.3.6. Method of Preparing Reaction Liquid

It is possible to manufacture the reaction liquid used in the present embodiment by dispersing and mixing the respective components described above by an appropriate method. After sufficiently stirring each of the above components, filtration is carried out in order to remove coarse particles and foreign matter which cause clogging to obtain the desired reaction liquid.

1.3.7. Physical Properties of Reaction Liquid

In a case where the reaction liquid used in the present embodiment is ejected from an ink jet head, the surface tension at 20° C. is preferably 18 mN/m or more and 40 mN/m or less, more preferably 20 mN/m or more and 35 mN/m or less, and even more preferably 22 mN/m or more and 33 mN/m or less. For the measurement of the surface tension, for example, it is possible to carry out measurement by confirming the surface tension when a platinum plate is wetted with the reaction liquid in an environment of 20° C. using an automatic surface tensiometer CBVP-Z (trade name, manufactured by Kyowa Interface Science Co., Ltd.).

In addition, from the same viewpoint, the viscosity of the reaction liquid used in the present embodiment at 20° C. is preferably 3 mPa·s or more and 10 mPa·s or less, and more preferably 3 mPa·s or more and 8 mPa·s or less. Here, it is possible to measure the viscosity, for example, using a viscoelasticity tester MCR-300 (trade name, manufactured by Pysica) in an environment of 20° C.

1.4. Recording Medium

The ink composition described above has an ink drying property and is able to obtain an image excellent in image quality and abrasion resistance in recording on a recording medium having an ink absorbing property, an ink non-absorbing property, or a low absorbing property. Among the above, it is possible to suitably use the ink composition described above with respect to a recording medium with an ink non-absorbing property or a low absorbing property by using the ink composition together with the reaction liquid described above.

Examples of the ink absorbing recording medium include fabrics such as cotton, silk, polyester, polyurethane, and nylon with a high ink absorbing property, plain paper, paper exclusively for ink jet use, high quality paper with a moderate absorbing property, plain paper such as recycled paper, copy paper, ink jet special paper provided with an ink receiving layer having ink absorbing ability, and the like.

Examples of recording media with an ink non-absorbing property include a plastic film which is not surface-treated for ink jet recording (that is, on which an ink absorbing layer is not formed), a recording medium where plastic is coated on a base material such as paper, a recording medium to which a plastic film is attached, or the like. Examples of plastics here include polyvinyl chloride, polyethylene terephthalate, polycarbonate, polystyrene, polyurethane, polyethylene, polypropylene, and the like.

Examples of recording media with a low ink absorbing property include a recording medium provided with a coating layer for receiving ink on the surface thereof and, in a case of a recording medium where the base material is paper, examples include printing paper such as art paper, coated paper, and matte paper, while in a case of a recording medium where the base material is a plastic film, examples include recording media in which a hydrophilic polymer is coated on the surface of polyvinyl chloride, polyethylene terephthalate, polycarbonate, polystyrene, polyurethane, polyethylene, polypropylene or the like, or recording media in which particles such as silica or titanium are coated with a binder. These recording media may be transparent recording media.

Here, the "recording medium with an ink non-absorbing property or with a low ink absorbing property" in the present specification means a "recording medium having a water absorption amount of 10 mL/m$^2$ or less from the start of contact to 30 msec$^{1/2}$ in the Bristow method". This Bristow method is the most popular method as a method for measuring the amount of liquid absorption in a short time and is also adopted by Japan Technical Association of the Pulp and Paper Industry (JAPAN TAPPI). The details of the test method are described in Standard No. 51 "Paper and paperboard-Liquid absorbing property test method-Bristow method" in "JAPAN TAPPI 2000 Paper Pulp Test Method".

In addition, it is possible to suitably use the above with respect to a recording medium with an ink non-absorbing property or a low ink absorbing property having irregularities on the surface thereof such as embossed media.

2. RECORDING MATERIAL

The recording method according to the present embodiment is a recording method using the ink set according to the present embodiment, the method including attaching the reaction liquid to a recording medium, attaching the first ink composition to the recording medium, and attaching the second ink composition to the recording medium. A description will be given below of the recording method according to the present embodiment with reference to an example of recording using the ink jet recording apparatus described above.

2.1. Reaction Liquid Attaching Step

The reaction liquid attaching step is a step of attaching the reaction liquid described above reacting with the ink composition to the recording medium. Attaching the reaction liquid to the recording medium makes it possible to improve the abrasion resistance and image quality of the obtained printed image.

The reaction liquid attaching step may be before the attachment of the ink composition or after the attachment of the ink composition and may be simultaneous with the attachment of the ink composition. In a case of attaching the reaction liquid before the attachment of the ink composition, the recording medium M is preferably heated by the pre-heater 7 shown in the FIGURE before the reaction liquid attaching step or by the IR heater 3 or the platen heater 4 shown in the FIGURE at the time of the reaction liquid attaching step. By allowing the reaction liquid to attach to the heated recording medium M, the reaction liquid ejected onto the recording medium M spreads easily on the recording medium M, and it is possible to uniformly coat the reaction liquid. Therefore, the ink attached in the ink composition attaching step described below reacts sufficiently with the reaction liquid, and excellent image quality is able to be obtained. In addition, since the reaction liquid is uniformly coated on the recording medium M, it is possible to reduce the coating amount and to prevent a reduction in the abrasion resistance of the obtained image.

Here, the surface temperature of the recording medium M at the time of attaching the reaction liquid is able to be set independently of the preferable temperature range of the surface temperature (primary heating temperature) of the recording medium M at the time of attaching ink described below. For example, the surface temperature of the recording medium M when attaching the reaction liquid is preferably 45° C. or lower, more preferably 40° C. or lower, and even more preferably 38° C. or lower. In addition, the lower limit value of the surface temperature of the recording medium M when attaching the reaction liquid is preferably 25° C. or higher, and more preferably 30° C. or higher. In a case where the surface temperature of the recording medium M at the time of attaching the reaction liquid is within the above range, it is possible to uniformly apply the reaction liquid to the recording medium M, and to improve the abrasion resistance and the image quality. In addition, it is possible to suppress the influence of heat on the ink jet head 2.

Here, attachment of the reaction liquid may be performed by ejection using the ink jet head 2 and examples of other methods include a method of coating the reaction liquid with a roll coater or the like, a method of ejecting the reaction liquid, and the like.

2.2. Ink Composition Attaching Step

The ink composition attaching step is a step of ejecting and attaching the ink composition described above from the ink jet head 2, and this step forms an image formed of the ink composition on the surface of the recording medium M.

In the present embodiment, "image" indicates a recording pattern formed from a group of dots, including text printing and solid images. Here, "solid image" means an image pattern of an image in which dots are recorded in all pixels of the pixels which are the minimum recording unit region defined by a recording resolution, and in which the recording region of the recording medium is normally covered with ink and the base of the recording medium is not visible.

Here, in the present embodiment, the ink composition attaching step includes a step of attaching the first ink composition to the recording medium and a step of attaching the second ink composition to the recording medium, in which the step of attaching the first ink composition to the recording medium and the step of attaching the second ink composition to the recording medium may be performed at the same time or not.

The maximum attachment amount of the ink composition per unit of area on the recording medium M is preferably 5 mg/inch$^2$ or more, more preferably 7 mg/inch$^2$ or more, and even more preferably 10 mg/inch$^2$ or more. The upper limit of the attachment amount of the ink composition per unit of area of the recording medium is not particularly limited, but is, for example, preferably 20 mg/inch$^2$ or less, more preferably 18 mg/inch$^2$ or less, and particularly preferably 16 mg/inch$^2$ or less. The maximum attachment amount of the ink composition is the total of the attachment amounts of the first ink composition and the second ink composition.

The ink composition attaching step may be provided with a heating step of heating the recording medium M with the IR heater 3 or the platen heater 4 before the ink composition attaching step or at the same time as the ink composition attaching step, and the ink composition attaching step is preferably performed on the recording medium M heated by the heating unit. Due to this, it is possible to quickly dry the ink on the recording medium M, and bleeding is suppressed. In addition, it is possible to form an image excellent in abrasion resistance, sticking resistance, and image quality, and, by using the ink described above, it is possible to provide an ink jet recording method excellent in ejection stability.

The upper limit of the surface temperature (primary heating temperature) of the recording medium M at the time of attaching the ink is preferably 45° C. or lower, more preferably 40° C. or lower, and even more preferably 38° C. or lower. The surface temperature of the recording medium at the time of attaching ink being in the above range makes it possible to suppress the influence of heat on the ink jet head 2 and to prevent clogging of the ink jet head 2 and the nozzle. In addition, the lower limit of the surface temperature of the recording medium M at the time of ink jet recording is preferably 25° C. or higher, more preferably 28° C. or higher, even more preferably 30° C. or higher, and particularly preferably 32° C. or higher. When the surface temperature of the recording medium M at the time of ink jet recording is in the above range, it is possible to quickly dry the ink on the recording medium M and fix the ink at an early stage, bleeding is suppressed, and it is possible to form an image excellent in abrasion resistance and image quality.

2.3. Secondary Heating Step

The recording method according to the present embodiment may have a secondary heating step of heating the recording medium M to which the ink composition is attached by the curing heater 5 shown in the FIGURE after the ink composition attaching step. Due to this, the fixing resin and the like included in the ink composition on the recording medium M are melted to form an ink film, the ink film firmly fixes (adheres) to the recording medium M, the film forming property is excellent, and it is possible to obtain a high-quality image excellent in abrasion resistance in a short time.

The upper limit of the surface temperature of the recording medium M according to the curing heater 5 is preferably 120° C. or lower, more preferably 110° C. or lower, and even more preferably 100° C. or lower. The lower limit of the surface temperature of the recording medium M is preferably 60° C. or higher, more preferably 70° C. or higher, and even more preferably 80° C. or higher. The temperature being within the above range makes it possible to obtain a high-quality image in a short time.

Here, after the secondary heating step, there may be a step of cooling the ink composition on the recording medium M using the cooling fan 6 shown in the FIGURE.

2.4. Other Steps

The ink jet recording method according to the present embodiment may be provided with a cleaning step of discharging the ink composition and the reaction liquid by a unit other than a pressure generating unit that ejects ink to carry out recording, that is, by a mechanism other than the mechanism for ejecting ink for recording provided in the ink jet head 2.

Examples of a mechanism for ejecting ink for recording provided in the ink jet head 2 include a piezo element or a heater element provided in the pressure chamber 21 to apply pressure to ink. This cleaning step may be a step of externally applying pressure to the ink jet head 2 to discharge the ink composition or reaction liquid from the nozzle. By providing this step, even in cases where there is a concern that the resin will be deposited on the inner wall of the ink jet head 2, it is possible to suppress this and to further improve the ejection stability.

Here, examples of the other mechanisms described above include a mechanism for applying pressure such as the application of suction (negative pressure) or the application of positive pressure from the upstream of the ink jet head. These mechanisms are not ink discharging (flushing) using the function of the ink jet head itself. In other words, these mechanisms are not discharging using the function of ejecting ink from the ink jet head in recording.

As described above, in the ink set and the recording method according to the present embodiment, a content of the fixing resin in the second ink composition in which the content of the coloring material is smaller than that in the first ink composition being greater than that in the first ink composition and a content of the resin-dissolving solvent which dissolves the resin on the recording medium also being greater than that in the first ink composition makes it possible to increase the abrasion resistance of the low duty region using the second ink composition. In addition, since using a reaction liquid makes it possible to form images without increasing the temperature during recording, it is possible to secure ejection stability of the head and to provide an ink set which is able to satisfy both abrasion resistance and clogging reliability in a recording method using light and dark inks.

3. EXAMPLES

A more specific description will be given below of embodiments of the invention with reference to Examples and Comparative Examples, but the present embodiment is not limited to only these Examples.

3.1. Preparation of Ink and Reaction Liquid

Each component was mixed and stirred so as to have the blending ratios shown in Table 1 and filtered with a membrane filter having a pore size of 5 μm to obtain reaction liquids 1 to 4, dark inks 1 to 6, and light inks 1 to 8. All values in Table 1 show % by mass and water was added thereto such that the total mass of the ink was 100% by mass. In addition, for pigments and resins, the values are converted to solid content.

TABLE 1

| | | Reaction liquid 1 | Reaction liquid 2 | Reaction liquid 3 | Reaction liquid 4 | Dark ink 1 | Dark ink 2 | Dark ink 3 | Dark ink 4 | Dark ink 5 | Dark ink 6 |
|---|---|---|---|---|---|---|---|---|---|---|---|
| Aggregating agent | Magnesium sulfate heptahydrate | 7 | — | — | — | — | — | — | — | — | — |
| | Cation master PD-7 | — | 4 | — | — | — | — | — | — | — | — |
| | Malonic acid | — | — | 7 | — | — | — | — | — | — | — |

TABLE 1-continued

|  |  |  |  |  |  |  |  |  |  |  |  |
|---|---|---|---|---|---|---|---|---|---|---|---|
| Pigment | Cyan (PB 15:3) | — | — | — | — | 4 | 4 | 4 | 4 | 4 | 4 |
| Fixing resin | Resin A | — | — | — | — | 4 | 4 | — | — | 7 | 4 |
|  | Resin B | — | — | — | — | — | — | 4 | — | — | — |
|  | Resin C | — | — | — | — | — | — | — | 4 | — | — |
| Resin-dissolving solvent | 2-Pyrrolidone | 15 | 15 | 15 | 15 | 15 | 15 | 15 | 15 | 15 | 25 |
| Organic solvent | Glycerine | — | — | — | — | — | 0.5 | — | — | — | — |
|  | Propylene glycol | 10 | 10 | 10 | 10 | 10 | 10 | 10 | 10 | 10 | 10 |
| Surfactant | Siloxane-based | 1 | 1 | 1 | 1 | 1 | 1 | 1 | 1 | 1 | 1 |
|  | Water | Remainder | Remainder | Remainder | Remainder | Remainder | Remainder | Remainder | Remainder | Remainder | Remainder |

|  |  | Light ink 1 | Light ink 2 | Light ink 3 | Light ink 4 | Light ink 5 | Light ink 6 | Light ink 7 | Light ink 8 |
|---|---|---|---|---|---|---|---|---|---|
| Aggregating agent | Magnesium sulfate heptahydrate | — | — | — | — | — | — | — | — |
|  | Cation master PD-7 | — | — | — | — | — | — | — | — |
|  | Malonic acid | — | — | — | — | — | — | — | — |
| Pigment | Cyan (PB 15:3) | 0.5 | 0.5 | 0.5 | 0.5 | 0.5 | 0.5 | 0.5 | 0.5 |
| Fixing resin | Resin A | 7 | 7 | — | 9 | 7 | — | 4 | 7 |
|  | Resin B | — | — | 7 | — | — | — | — | — |
|  | Resin C | — | — | — | — | — | 7 | — | — |
| Resin-dissolving solvent | 2-Pyrrolidone | 20 | 20 | 20 | 20 | 25 | 20 | 20 | 15 |
| Organic solvent | Glycerine | — | 0.5 | — | — | — | — | — | — |
|  | Propylene glycol | 10 | 10 | 10 | 10 | 10 | 10 | 10 | 10 |
| Surfactant | Siloxane-based | 1 | 1 | 1 | 1 | 1 | 1 | 1 | 1 |
|  | Water | Remainder | Remainder | Remainder | Remainder | Remainder | Remainder | Remainder | Remainder |

For the solvent, the calculated Hildebrand SP value (δ) shown in Formula I was used, and for the resin, a resin was added to a solvent whose SP value was known such that the resin solid content concentration in the solution was 0.5% by mass, the dispersion stability of the resin was visually confirmed, and a low SP value at which dispersion was possible was taken as the resin SP value.

$$\delta = \sqrt{(\Delta H - RT)/V} \quad \text{Expression (I)}$$

Details of the substances described in Table 1 are as follows.

Aggregating Agent
  Polyvalent metal salt: magnesium sulfate heptahydrate
  Cationic resin: Cation master PD-7 (trade name, manufactured by Yokkaichi Chemical Company, Ltd.)
  Organic acid: Malonic acid
Pigment
  Cyan pigment: C. I. Pigment Blue 15: 3 (PB 15: 3)
Resin
  Resin A (SP value: 17 Reactivity: Low): Elitel KT 8701 (trade name, manufactured by Unitika Ltd.)
  Resin B (SP value: 20 Reactivity: Low): EPOCROS K-2030E (trade name, manufactured by Nippon Shokubai Co., Ltd.)
  Resin C (SP value: 17 Reactivity: High): AQUACER 539 (trade name, manufactured by BYK Additives & Instruments))
Surfactant
  Siloxane surfactant: BYK 348 (trade name, manufactured by BYK Additives & Instruments)

3.2. Evaluation of Resin Reactivity

Regarding the resins A, B and C described above, in a 25° C. environment, the average particle diameter (D50) was confirmed when a resin solution in which a solid content concentration of 1% by mass was dispersed in water and a 0.3 M magnesium sulfate reaction liquid were stirred at a 1:1 ratio for 1 minutes and the reactivity of the resin was evaluated according to the following criteria.

Evaluation Criteria
Low reactivity: increase in average particle diameter is less than 5 times.
High reactivity: increase in average particle diameter is 5 times or more.

3.3. Evaluation of Ink Set and Recording Method

Next, an evaluation test was carried out using the reaction liquid and the light and dark inks shown in Table 1.

3.3.1. Image Formation

A remodeled machine of an ink jet printer (trade name "PX-G930", manufactured by Seiko Epson Corp.) was prepared, and the platen heater was made temperature adjustable. As a recording medium, a polyvinyl chloride film for indoor and outdoor signs (trade name "IJ180-10", manufactured by 3M Japan Ltd.) was used.

First, a reaction liquid, a dark ink, and a light ink were filled in a head of an ink jet printer, and the reaction liquid was ink jet-coated in an amount of 10% by mass in terms of the ink application amount ratio. Next, light and dark inks filled in the head were ink jet coated on the reaction liquid attaching surface in an amount such that the ink attachment amount was an attachment amount of 12 mg/inch$^2$ (dark ink: 6 mg/inch$^2$, light ink: 6 mg/inch$^2$) and a mixed light and dark solid image was created. At the time of ink jet coating, the platen heater was operated to adjust the surface temperature of the recording medium to the primary heating temperatures shown in Tables 2 and 3. After recording, the recording medium was discharged from the printer and dried with the surface temperature of the recording medium at the secondary heating temperatures shown in Tables 2 and 3. The obtained image was visually judged and evaluated according to the following criteria.

Evaluation Criteria
A: There is no density unevenness in the solid surface and no ink accumulation in a deep portion.
B: There is no density unevenness in the solid surface, but there is some ink accumulation in a deep portion.
C: There is density unevenness in the solid surface and there is ink accumulation in a deep portion.

TABLE 2

|  |  | Example 1 | | | Example 2 | | | Example 3 | | |
| --- | --- | --- | --- | --- | --- | --- | --- | --- | --- | --- |
| Ink set |  | Reaction liquid 1 | Dark ink 1 | Light ink 1 | Reaction liquid 1 | Dark ink 2 | Light ink 2 | Reaction liquid 1 | Dark ink 3 | Light ink 3 |
| SP value | Resin |  | 17 |  |  | 17 |  |  | 20 |  |
|  | Solvent |  | 14 |  |  | 14 |  |  | 14 |  |
| SP value difference | (Absolute value of Resin − Solvent) |  | 3 |  |  | 3 |  |  | 6 |  |
| Resin content difference | Light ink − Dark ink |  | 3 |  |  | 3 |  |  | 3 |  |
| Resin-dissolving solvent addition amount difference | Light ink − Dark ink |  | 5 |  |  | 5 |  |  | 5 |  |
| Recording medium surface temperature | During recording (primary heating) |  | 35 |  |  | 35 |  |  | 35 |  |
|  | After recording (secondary heating) |  | 80 |  |  | 80 |  |  | 80 |  |
| Resin reaction liquid reactivity |  |  | Low |  |  | Low |  |  | Low |  |
| Evaluation results | Image formation |  | A |  |  | A |  |  | A |  |
|  | Abrasion resistance |  | A |  |  | B |  |  | B |  |
|  | Clogging | A | A | A | A | A | A | A | A | A |

|  |  | Example 4 | | | Example 5 | | | Example 6 | | |
| --- | --- | --- | --- | --- | --- | --- | --- | --- | --- | --- |
| Ink set |  | Reaction liquid 1 | Dark ink 1 | Light ink 4 | Reaction liquid 1 | Dark ink 1 | Light ink 5 | Reaction liquid 1 | Dark ink 4 | Light ink 6 |
| SP value | Resin |  | 17 |  |  | 17 |  |  | 17 |  |
|  | Solvent |  | 14 |  |  | 14 |  |  | 14 |  |
| SP value difference | (Absolute value of Resin − Solvent) |  | 3 |  |  | 3 |  |  | 3 |  |
| Resin content difference | Light ink − Dark ink |  | 5 |  |  | 3 |  |  | 3 |  |
| Resin-dissolving solvent addition amount difference | Light ink − Dark ink |  | 5 |  |  | 10 |  |  | 5 |  |
| Recording medium surface temperature | During recording (primary heating) |  | 35 |  |  | 35 |  |  | 35 |  |
|  | After recording (secondary heating) |  | 80 |  |  | 80 |  |  | 80 |  |
| Resin reaction liquid reactivity |  |  | Low |  |  | Low |  |  | High |  |
| Evaluation results | Image formation |  | A |  |  | A |  |  | A |  |
|  | Abrasion resistance |  | A |  |  | A |  |  | B |  |
|  | Clogging | A | A | B | A | A | B | A | A | A |

TABLE 3

|  |  | Example 7 | | | Example 8 | | | Example 9 | | | Example 10 | | |
| --- | --- | --- | --- | --- | --- | --- | --- | --- | --- | --- | --- | --- | --- |
| Ink set |  | Reaction liquid 1 | Dark ink 1 | Light ink 1 | Reaction liquid 1 | Dark ink 1 | Light ink 1 | Reaction liquid 2 | Dark ink 1 | Light ink 1 | Reaction liquid 3 | Dark ink 1 | Light ink 1 |
| SP value | Resin |  | 17 |  |  | 17 |  |  | 17 |  |  | 17 |  |
|  | Solvent |  | 14 |  |  | 14 |  |  | 14 |  |  | 14 |  |
| SP value difference | (Absolute value of Resin − Solvent) |  | 3 |  |  | 3 |  |  | 3 |  |  | 3 |  |
| Resin content difference | Light ink − Dark ink |  | 3 |  |  | 3 |  |  | 3 |  |  | 3 |  |
| Resin-dissolving solvent addition amount difference | Light ink − Dark ink |  | 5 |  |  | 5 |  |  | 5 |  |  | 5 |  |
| Recording medium surface temperature | During recording (primary heating) |  | 45 |  |  | 40 |  |  | 35 |  |  | 35 |  |
|  | After recording (secondary heating) |  | 80 |  |  | 70 |  |  | 80 |  |  | 80 |  |
| Resin reaction liquid reactivity |  |  | Low |  |  | Low |  |  | Low |  |  | Low |  |
| Evaluation results | Image formation |  | A |  |  | A |  |  | A |  |  | B |  |
|  | Abrasion resistance |  | A |  |  | B |  |  | A |  |  | B |  |
|  | Clogging | A | B | B | A | A | A | A | A | A | A | A | A |

|  |  | Comparative Example 1 | | | Comparative Example 2 | | | Comparative Example 3 | | |
| --- | --- | --- | --- | --- | --- | --- | --- | --- | --- | --- |
| Ink set |  | Reaction liquid 1 | Dark ink 5 | Light ink 7 | Reaction liquid 1 | Dark ink 6 | Light ink 8 | Reaction liquid 4 | Dark ink 1 | Light ink 1 |
| SP value | Resin |  | 17 |  |  | 17 |  |  | 17 |  |
|  | Solvent |  | 14 |  |  | 14 |  |  | 14 |  |
| SP value difference | (Absolute value of Resin − Solvent) |  | 3 |  |  | 3 |  |  | 3 |  |
| Resin content difference | Light ink − Dark ink |  | −3 |  |  | 5 |  |  | 3 |  |
| Resin-dissolving solvent addition amount difference | Light ink − Dark ink |  | 5 |  |  | −5 |  |  | 5 |  |

TABLE 3-continued

| Recording medium surface temperature | During recording (primary heating) | 40 | 40 | 35 |
|---|---|---|---|---|
| | After recording (secondary heating) | 80 | 80 | 80 |
| Resin reaction liquid reactivity | | Low | Low | Low |
| Evaluation results | Image formation | C | A | C |
| | Abrasion resistance | C | B | A |
| | Clogging | A A A | A C A | A A A |

3.3.2. Evaluation of Abrasion Resistance

A reaction liquid, a dark ink, and a light ink were filled in a head of an ink jet printer, and the reaction liquid was ink jet-coated in an amount of 10% by mass in terms of the ink application amount ratio. Next, light and dark inks filled in the head were ink jet coated on the reaction liquid attaching surface in an amount such that the ink attachment amount was an attachment amount of 6 mg/inch$^2$ (dark ink: 3 mg/inch$^2$, light ink: 3 mg/inch$^2$) and a mixed light and dark solid image was created. At the time of ink jet coating, the platen heater was operated to adjust the surface temperature of the recording medium to the primary heating temperatures shown in Tables 2 and 3. After recording, the recording medium was discharged from the printer and dried with the surface temperature of the recording medium at the secondary heating temperatures shown in Tables 2 and 3.

Regarding the obtained printed matter, abrasion resistance/moisture friction resistance: the abrasion resistance was evaluated using a Color Fastness Rubbing Tester AB-301 (trade name, manufactured by Tester Sangyo Co., Ltd.). Specifically, the surface of the recording medium on which the image was recorded was rubbed 10 times back and forth with a friction element with a white cotton cloth attached (conforming to JIS L 0803) under a load of 500 g. Then, the degree of peeling of the image (coating film) on the surface of the recording medium was visually observed and evaluated according to the following criteria.

Evaluation Criteria
A: When a 500 g load was rubbed 10 times, no peeling occurs.
B: When a 500 g load was rubbed 10 times, peeling occurred within 10% of the evaluation area.
C: When a 500 g load was rubbed 10 times, peeling of 10% or more occurred with respect to the evaluation area.

3.3.3. Evaluation of Clogging Recovery

In an A4 size recording medium, image recording was continuously performed on 50 sheets under conditions of 3.3.1. described above and the state of the nozzles of the nozzle row after recording was evaluated according to the following criteria.

Evaluation Criteria
A: No missing nozzles/bending occurred even after printing 50 sheets.
B: When printing 50 sheets, nozzle bending occurred.
C: When printing 50 sheets, missing nozzles occurred.

3.4. Evaluation Results

The results of the evaluation test are shown in the lower part of Tables 2 and 3. In the evaluation of the three evaluation tests, the evaluations are A: extremely good, B: good (limited uses), and C: unusable.

In each of the Examples, the image quality was good, and the results of abrasion resistance and clogging reliability were also good. In particular, in Example 1 of Table 2, in both the images formed using both the dark ink and the light ink, the image quality, abrasion resistance, and clogging reliability were all excellent.

In detail, Example 1 is superior to Example 2 in abrasion resistance since Example 1 does not contain glycerine which is an alkylene polyol-based organic solvent having a standard boiling point over 280° C., in comparison with Example 2. In addition, in Example 1, since the SP value of the fixing resin is lower in comparison with Example 3 and the difference in SP value from the resin-dissolving solvent is small, the solubility of the fixing resin on the recording medium is high, and Example 1 was superior in abrasion resistance to Example 3. Furthermore, in Example 1, since the content of the fixing resin of the light ink was appropriate in comparison with Example 4, the clogging reliability was superior to that of Example 4. In addition, in Example 1, since the content of the resin-dissolving solvent of the light ink was also appropriate in comparison with Example 5, the clogging reliability was also excellent. Then, in Example 1, since the reactivity of the resin was lower in comparison with Example 6, Example 1 was superior in abrasion resistance to Example 6.

In addition, regarding the temperatures during recording and after recording, in Example 1, since the temperature during recording was lower than that in Example 7 in Table 3, the clogging reliability was superior to that of Example 7. In addition, in Example 1, since the secondary heating temperature is higher in comparison with Example 8, the fixing resin is sufficiently melted on the recording medium to form a film, and Example 1 is superior in abrasion resistance to Example 8.

Regarding the aggregating agent included in the reaction liquid, from Examples 1, 9 and 10, using a polyvalent metal salt or a cationic resin is superior to the organic acid as the aggregating agent in terms of image formation and abrasion resistance.

In contrast to these Examples, in Comparative Example 1, the content of the fixing resin of the light ink was smaller than that of the dark ink, and particularly in the image formed using the light ink, in addition to the density unevenness in the solid surface and the accumulation of ink in a deep portion, the abrasion resistance was inferior, particularly in the region where light ink was used. In addition, in Comparative Example 2, the content of the resin-dissolving solvent of the dark ink was greater than that of the light ink, and the resin was dissolved in the nozzle on the dark ink side to cause clogging. In Comparative Example 3, since the reaction liquid was not used, the image quality was inferior in the images formed using either the dark ink or the light ink.

As described above, in all of the Examples, the recording was performed using the reaction liquid, the content of the fixing resin of the light ink was greater than the content of the fixing resin of the dark ink, the content of the resin-dissolving solvent of the light ink was greater than the content of the resin-dissolving solvent of the dark ink, and, due to this, the image quality was good and the results of abrasion resistance and clogging reliability were also good.

The invention is not limited to the above-described embodiment, and various modifications are possible. For example, the invention includes configurations substantially the same as the configurations described in the embodiments (for example, configurations having the same function, method, and result, or configurations having the same object and effect). In addition, the invention includes configurations in which non-essential parts of the configurations described in the embodiments are replaced. In addition, the invention includes configurations which achieve the same operation and effect as the configurations described in the embodiments, or configurations able to achieve the same object. In addition, the invention includes configurations in which a publicly-known technique is added to the configurations described in the embodiments.

The entire disclosure of Japanese Patent Application No. 2017-186732, filed Sep. 27, 2017 is expressly incorporated by reference herein.

What is claimed is:

1. An ink set configured to be attached to a recording medium, the ink set comprising:
   a reaction liquid configured to react with and aggregate components of an ink composition;
   a first ink composition which includes a coloring material, a fixing resin, and a resin-dissolving solvent; and
   a second ink composition which includes a coloring material, a fixing resin, and a resin-dissolving solvent and which is the same color ink as the first ink composition,
   wherein a content of the coloring material in the second ink composition is smaller than a content of the coloring material in the first ink composition on a mass basis,
   a content of the fixing resin in the second ink composition is greater than a content of the fixing resin in the first ink composition on a mass basis, and
   a content of the resin-dissolving solvent in the second ink composition is greater than a content of the resin-dissolving solvent in the first ink composition on a mass basis.

2. The ink set according to claim 1,
   wherein the fixing resin included in the second ink composition includes a resin with an average particle diameter which changes so as to be increased by less than five times when a 0.3 M magnesium sulfate aqueous solution and a resin liquid in which 1% by mass of a resin is dispersed in water are stirred for one minute at a mass ratio of 1:1 in an environment of 25° C.

3. The ink set according to claim 1,
   wherein the content of the fixing resin in the second ink composition is greater than the content of the fixing resin in the first ink composition by 0.5% by mass or more and 5% by mass or less.

4. The ink set according to claim 1,
   wherein the content of the resin-dissolving solvent in the second ink composition is greater than the content of the resin-dissolving solvent in the first ink composition by 0.5% by mass or more and 10% by mass or less.

5. The ink set according to claim 1,
   wherein the content of the resin-dissolving solvent in the second ink composition is 20% by mass or less.

6. The ink set according to claim 1,
   wherein the first ink composition and the second ink composition each contain an alkylene polyol-based organic solvent having a standard boiling point over 280° C. with a content of less than 1% by mass.

7. The ink set according to claim 1,
   wherein the resin-dissolving solvent and the fixing resin included in the second ink composition have a difference in SP value of 5 or less.

8. The ink set according to claim 1, wherein the resin-dissolving solvent in each of the first ink composition and the second ink composition includes at least one of a cyclic amide, an alkoxyamide, a cyclic ester, and an ester.

9. The ink set according to claim 1, wherein a content of the resin-dissolving solvent is 3 to 20% by mass with respect to the total mass of the first ink composition.

10. The ink set according to claim 1, wherein a content of the resin-dissolving solvent is 5 to 25% by mass with respect to the total mass of the second ink composition.

11. The ink set according to claim 1, wherein the content of the resin-dissolving solvent in the second ink composition is greater than the content of the resin-dissolving solvent in the first ink composition by 3% by mass or more.

12. The ink set according to claim 1, wherein a content of the fixing resin is 0.5 to 15% by mass with respect to the total mass of the first ink composition.

13. The ink set according to claim 1, wherein a content of the fixing resin is 2 to 15% by mass with respect to the total mass of the second ink composition.

14. The ink set according to claim 1, wherein the fixing resin included in each of the first ink composition and the second ink compositions comprises fine particles.

15. The ink set according to claim 1, wherein the fixing resin included in the first ink composition and the fixing resin included in the second ink composition are, independently, at least one of an acrylic resin, a polyurethane resin, a polyester resin, and a polyether resin.

16. A recording method using the ink set according to claim 1, the method comprising:
    attaching the reaction liquid to a recording medium;
    attaching the first ink composition to the recording medium; and
    attaching the second ink composition to the recording medium.

17. The recording method according to claim 16,
    wherein, when attaching the first ink composition to the recording medium and attaching the second ink composition to the recording medium, a surface temperature of the recording medium is 45° C. or lower, and
    when heating the recording medium after each attaching, the surface temperature of the recording medium is 70° C. or higher.

18. The recording method according to claim 16,
    wherein any one of a polyvalent metal salt, a cationic resin, and an organic acid is included as an aggregating agent included in the reaction liquid.

* * * * *